(12) United States Patent
Suzuki et al.

(10) Patent No.: US 9,819,203 B2
(45) Date of Patent: Nov. 14, 2017

(54) ELECTRIC POWER TOOL SYSTEM

(71) Applicant: MAKITA CORPORATION, Anjo-shi (JP)

(72) Inventors: Hitoshi Suzuki, Anjo (JP); Takuya Umemura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/377,034

(22) Filed: Dec. 13, 2016

(65) Prior Publication Data

US 2017/0093188 A1 Mar. 30, 2017

Related U.S. Application Data

(63) Continuation of application No. 14/532,474, filed on Nov. 4, 2014, now Pat. No. 9,553,466, which is a (Continued)

(30) Foreign Application Priority Data

Oct. 27, 2010 (JP) ................................ 2010-241479
Mar. 7, 2011 (JP) ................................ 2011-048918

(51) Int. Cl.
*H02J 7/00* (2006.01)
*H01M 10/46* (2006.01)
(Continued)

(52) U.S. Cl.
CPC ......... *H02J 7/0027* (2013.01); *H01M 2/1022* (2013.01); *H01M 10/0525* (2013.01);
(Continued)

(58) Field of Classification Search
CPC ...................................................... H02J 7/0027
(Continued)

(56) References Cited

U.S. PATENT DOCUMENTS 3,629,680 A 12/1971 Baynes et al.
4,005,812 A 2/1977 Doyle et al.
(Continued)

FOREIGN PATENT DOCUMENTS

CN 1380732 A 11/2002
CN 1388620 A 1/2003
(Continued)

OTHER PUBLICATIONS

Communication dated Nov. 5, 2013 from Chinese Patent Office for related Chinese patent application No. 20111034603.1, and English translation thereof.
(Continued)

*Primary Examiner* — Edward Tso
*Assistant Examiner* — Ahmed Omar
(74) *Attorney, Agent, or Firm* — J-TEK Law PLLC; Jeffrey D. Tekanic; Scott T. Wakeman

(57) ABSTRACT

An electric power tool system comprises a tool main body, a battery pack detachably attached to the tool main body, and a first charger that charges the battery pack. The first charger comprises a rechargeable battery that supplies current to at least one rechargeable battery of the battery pack. The at least one rechargeable battery of the first charger preferably has a larger charge storage capacity than the at least one rechargeable battery of the battery pack.

20 Claims, 20 Drawing Sheets

Related U.S. Application Data continuation of application No. 13/281,300, filed on Oct. 25, 2011, now Pat. No. 8,912,751.

(51) Int. Cl.
  *H01M 10/0525* (2010.01)
  *H01M 2/10* (2006.01)

(52) U.S. Cl.
  CPC .......... *H01M 10/46* (2013.01); *H02J 7/0044* (2013.01); *H02J 7/0045* (2013.01); *H02J 7/0054* (2013.01); *H01M 2220/30* (2013.01)

(58) Field of Classification Search
  USPC ................................................ 320/103, 108
  See application file for complete search history.

(56) References Cited

U.S. PATENT DOCUMENTS

| | | | |
|---|---|---|---|
| 4,827,534 A | 5/1989 | Haugen | |
| 5,396,142 A | 3/1995 | Koblanski | |
| 5,396,162 A | 3/1995 | Brilmyer | |
| 5,525,888 A | 6/1996 | Toya | |
| 5,914,585 A | 6/1999 | Grabon | |
| 6,043,626 A | 3/2000 | Snyder et al. | |
| 6,049,192 A | 4/2000 | Kfoury et al. | |
| 6,066,938 A | 5/2000 | Hyodo et al. | |
| 6,104,162 A | 8/2000 | Sainsbury et al. | |
| 6,124,699 A | 9/2000 | Suzuki et al. | |
| 6,288,518 B1 | 9/2001 | Yang et al. | |
| 7,176,656 B2 | 2/2007 | Feldmann | |
| 7,589,500 B2 | 9/2009 | Johnson et al. | |
| 7,863,862 B2 | 1/2011 | Idzik et al. | |
| 8,907,623 B2 | 12/2014 | Saur | |
| 2002/0122707 A1 | 9/2002 | Sakai et al. | |
| 2002/0149345 A1 | 10/2002 | Takano et al. | |
| 2002/0175654 A1 | 11/2002 | Takano et al. | |
| 2003/0197485 A1 | 10/2003 | Miller et al. | |
| 2004/0051388 A1 | 3/2004 | Lin | |
| 2004/0066172 A1 | 4/2004 | Takano et al. | |
| 2005/0040785 A1 | 2/2005 | Barnes et al. | |
| 2005/0280393 A1* | 12/2005 | Feldmann | H02J 7/0014 320/114 |
| 2006/0087283 A1 | 4/2006 | Phillips et al. | |
| 2006/0087284 A1 | 4/2006 | Phillips et al. | |
| 2006/0087285 A1 | 4/2006 | Phillips et al. | |
| 2006/0087286 A1 | 4/2006 | Phillips et al. | |
| 2006/0222930 A1 | 10/2006 | Aradachi et al. | |
| 2006/0244414 A1 | 11/2006 | Lay | |
| 2007/0096687 A1 | 5/2007 | Fuchs | |
| 2007/0120527 A1 | 5/2007 | Roehm et al. | |
| 2007/0170220 A1 | 7/2007 | Fragassi | |
| 2008/0061733 A1 | 3/2008 | Toya | |
| 2008/0284371 A1 | 11/2008 | Hsu | |
| 2008/0315829 A1* | 12/2008 | Jones | H02J 7/345 320/103 |
| 2009/0027005 A1 | 1/2009 | Osswald et al. | |
| 2009/0072787 A1 | 3/2009 | Fuchs | |
| 2009/0263704 A1 | 10/2009 | Batra | |
| 2010/0085008 A1 | 4/2010 | Suzuki et al. | |
| 2010/0092850 A1 | 4/2010 | Ueda et al. | |
| 2010/0141207 A1 | 6/2010 | Phillips et al. | |
| 2010/0171367 A1 | 7/2010 | Kitamura et al. | |
| 2010/0192314 A1 | 8/2010 | Otsuka et al. | |
| 2010/0239903 A1 | 9/2010 | Churchill | |
| 2011/0030986 A1 | 2/2011 | Nagasaka et al. | |
| 2011/0133696 A1 | 6/2011 | Scrimshaw et al. | |
| 2011/0156636 A1 | 6/2011 | Kim | |
| 2011/0169481 A1 | 7/2011 | Nguyen et al. | |
| 2011/0214303 A1 | 9/2011 | Inayoshi | |
| 2011/0253402 A1 | 10/2011 | Aradachi et al. | |
| 2012/0104991 A1 | 5/2012 | Suzuki et al. | |
| 2013/0154563 A1 | 6/2013 | Churchill | |
| 2014/0014384 A1 | 1/2014 | Horie et al. | |
| 2014/0103858 A1 | 4/2014 | Bertsch et al. | |
| 2015/0054464 A1 | 2/2015 | Suzuki et al. | |
| 2016/0268835 A1 | 9/2016 | Rejman | |

FOREIGN PATENT DOCUMENTS

| | | |
|---|---|---|
| CN | 101007401 A | 8/2007 |
| CN | 101022926 A | 8/2007 |
| CN | 200945605 Y | 9/2007 |
| CN | 101154819 A | 4/2008 |
| CN | 101512366 A | 8/2009 |
| DE | 202006004920 U1 | 6/2006 |
| DE | 102005015654 A1 | 10/2006 |
| EP | 0951127 A | 10/1999 |
| JP | H01170329 A | 7/1989 |
| JP | 2001145276 A | 5/2001 |
| JP | 2001169470 A | 6/2001 |
| JP | 3093893 U | 5/2003 |
| JP | 2004015932 A | 1/2004 |
| JP | 2005073350 A | 3/2005 |
| JP | 2008048482 A | 2/2008 |
| JP | 2008517578 A | 5/2008 |
| JP | 2008207287 A | 9/2008 |
| JP | 2010225589 A | 10/2010 |
| JP | 2011097681 A | 5/2011 |
| WO | 2006044693 A | 4/2006 |
| WO | 2009143575 A1 | 12/2009 |
| WO | 2012123210 A1 | 3/2011 |

OTHER PUBLICATIONS

Communication from the European Patent Office dated Nov. 21, 2014 in related European patent application No. 11 186 359, including examined claims 1-15.
Communication from the European Patent Office dated Apr. 29, 2015 in related European patent application No. 11 186 381.7, including examined claims 1-14.
Extended European Search Report dated Jan. 25, 2012 for related European patent application No. 11186377.5.
Extended European Search Report dated Jan. 27, 2012 for related European patent application No. 11186381.7.
Final Office Action dated Jul. 30, 2014 in related U.S. Appl. No. 13/281,281.
Japanese Office Action dated Sep. 24, 2014, in related Japanese application 2011-048918 and English translation of Office Action.
Non-final Office Action dated Feb. 21, 2014 in related U.S. Appl. No. 13/281,281.
Office Action from the United States Patent Office dated Jun. 15, 2016 in related U.S. Appl. No. 14/526,976.
Office Action dated Apr. 1, 2014 from Japanese Patent Office for related (priority) JP application No. 2010-241480, including English translation thereof.
Office Action dated Dec. 17, 2014 in related Chinese patent application No. 201110334605.0, including English translation thereof.
Office Action dated Jul. 10, 2014 in related Chinese patent application No. 201110334603.1, including English translation thereof.
Office Action dated Jun. 24, 2014 from Japanese Patent Office for related JP application No. 2010-241480, including English translation thereof.
Office Action dated Nov. 28, 2013 in counterpart Chinese patent application No. 201110334605.0, including English translation thereof.
US Non-Final Office Action dated Nov. 15, 2016 in related U.S. Appl. No. 14/526,976.
Final Office Action dated Mar. 29, 2017 in U.S. Appl. No. 14/526,976 and examined claims 21-26, 28-36 and 38-42.

\* cited by examiner excellent # ELECTRIC POWER TOOL SYSTEM

CROSS-REFERENCE TO RELATED APPLICATIONS

This application is a continuation of U.S. patent application Ser. No. 14/532,474, filed on Nov. 4, 2014, now pending, which is a continuation of U.S. patent application Ser. No. 13/281,300, filed on Oct. 25, 2011, now U.S. Pat. No. 8,912,751, which claims priority to Japanese Patent Application No. 2010-241479 filed on Oct. 27, 2010 and Japanese Patent Application No. 2011-048918 filed on Mar. 7, 2011, the contents of which are hereby incorporated by reference into the present application.

TECHNICAL FIELD

The present disclosure relates to electric (cordless) power tool systems that use a battery pack as a power source.

RELATED ART

A well known type of electric (cordless) power tool system is disclosed in WO 2006/044693 A2. This electric power tool system comprises a tool main body, a battery pack detachably attached to the tool main body, and a charger for charging the battery pack.

SUMMARY

Such a cordless electric power tool system does not require an external power source (e.g., a wall socket) to drive the electric power tool. Instead, the user may simply charge the battery pack prior to using the electric power tool. However, the charge storage capacity of the battery pack is limited and the amount of work (workload) that the electric power tool can perform depends on the capacity of the battery pack. In light of this, it has been preferable in the past to utilize a battery pack having a relative large charge storage capacity. But, battery packs having relatively large charge storage capacities also have a relatively large size (volume) and weight. In other words, if the capacity of the battery pack is larger, on the one hand the amount of work that the electric power tool can perform will increase, but on the other hand the electric power tool will be heavier and more cumbersome to use.

It is an object of the present teachings to disclose an improved electric (cordless) power tool system and method, which may, e.g., both increase the amount of work that the cordless electric power tool can perform while also improving its ease of use.

In typical power tool operations, a user intermittently operates an electric power tool, and each operation of the electric power tool is relatively short. Therefore, if the battery pack were to be charged frequently, e.g., during each interval between power tool operations, it may be possible to operate the power tool for long periods of time without ever completely depleting the battery pack, even if the charge storage capacity of the battery pack is relatively small. However, if an external power source (e.g., a wall socket or a portable generator) is always necessary for charging the battery pack, the electric power tool cannot be used in locations where an external power source is not available. On the other hand, if the battery pack can be charged by using another charge storage device (e.g., a primary battery or a rechargeable battery), the user can use the electric power tool even in locations where an external power source is not available.

In a first aspect of the present teachings, an electric power tool system may comprise a tool main body, a battery pack that is detachably attachable to the tool main body, and a first charger configured or adapted to charge the battery pack. The first charger includes a rechargeable battery that is capable of supplying electric current to the battery pack.

According to such an exemplary system, the user can charge the battery pack using the first charger even at locations where an external power source is not available. By placing the first charger adjacent to the location where power tool operations are being performed, the user can charge the battery pack frequently during each interval between power tool operations by simply setting the battery pack (while connected to the tool main body) on the first charger. Accordingly, the user can perform a relatively large amount of work using the electric power tool, even if the charge storage capacity of the battery pack is relatively small. Generally speaking, the size and weight of the battery pack are proportional to the charge storage capacity of the battery pack for a given battery chemistry. Therefore, power tool systems according to the present teachings may optionally employ a relatively small and light weight battery pack having a relatively small charge storage capacity without affecting overall power tool performance, such as the amount of work that can be performed before the battery pack must be detached from the tool main body and recharged using a conventional battery charger. Thus, the size and weight of the electric power tool including the battery pack can be decreased, thereby improving the ease of use of the electric power tool.

Further objects, embodiments, advantages and details of the present teachings will be apparent after reading the following description of the exemplary embodiments in view of the attached drawings and claims.

DETAILED DESCRIPTION

Figure 1:
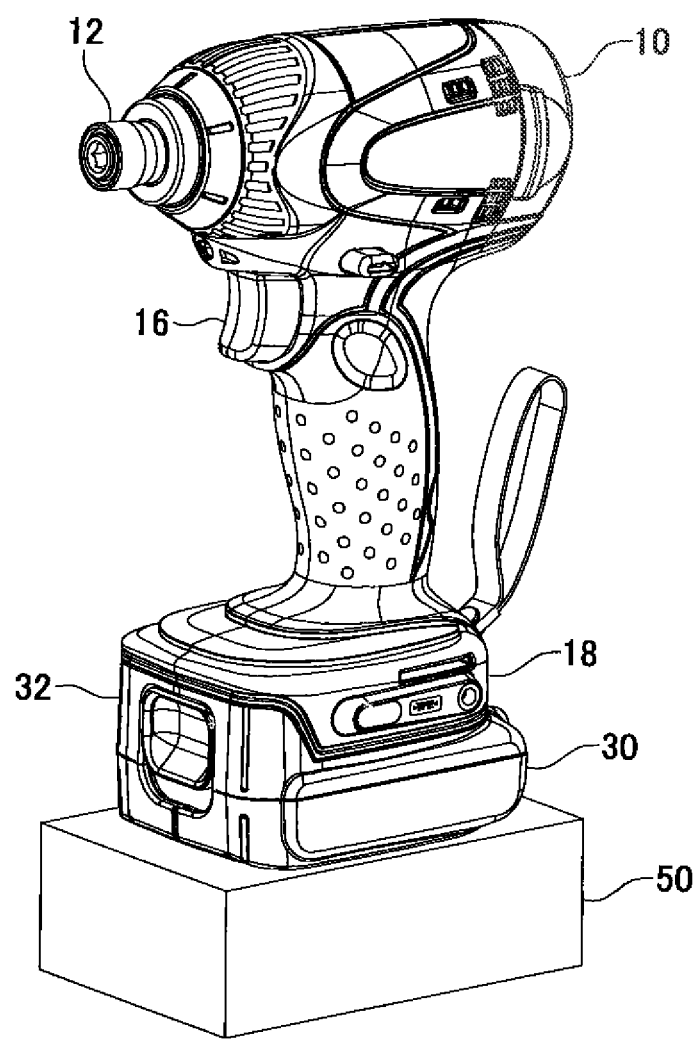
FIG. 1 shows a tool main body, a battery pack, and a cordless charger of an electric power tool system according to Embodiment 1 of the present teachings.

In one embodiment of the present teachings, the first charger preferably includes a first unit, and a second unit detachably attached to the first unit. Preferably, the first unit houses the rechargeable battery, and the second unit includes an interface configured to attach to the battery pack. With such a construction, a great number of charges can be performed by providing a plurality of first units and using these in series. By sharing the second unit with the plurality of first units, the construction of the overall system can be simplified.

In the aforementioned embodiment, it is preferable that the second unit also includes an interface configured to attach to the tool main body, and is electrically interposed between the tool main body and the battery pack. In this embodiment, the electric current output from the battery pack will be supplied to the tool main body via the second unit when the electric power tool is used. When the battery pack is to be charged, the charging current from the first unit will be supplied to the battery pack via the second unit.

In addition or in the alternative, the first charger is preferably capable of charging the battery pack while the battery pack is attached to the tool main body. With such a construction, there is no need to remove the battery pack from the tool main body when the battery pack requires charging. The user can thus easily charge the battery pack between power tool operations.

In addition or in the alternative, the charge storage capacity of the rechargeable battery housed in the first charger is preferably larger than the charge storage capacity of the rechargeable battery housed in the battery pack. With such a construction, the overall size and weight of the electric power tool (the tool main body and the battery pack) can be decreased while increasing the amount of work that the user can perform using the electric power tool, i.e. using a single charged battery pack (which may be frequently recharged during its operation).

In addition or in the alternative, the maximum allowable current of the rechargeable battery housed in the first charger is preferably less than the maximum allowable current of the rechargeable battery housed in the battery pack. In other words, although the rechargeable battery(ies) of the battery pack must output a relative large electric current in order to adequately serve as the power source for the electric power tool, there is no need to output such a large electric current to the rechargeable battery of the first charger. Instead, it is preferable to use a rechargeable battery that has a relatively high charge storage capacity (i.e. higher than the charge storage capacity of the battery(ies) in the battery pack). For example, as compared to lithium ion cells designed for electric power tools, lithium ion cells designed for notebook PCs are generally capable of outputting a lower maximum allowable current, but have a much greater charge storage capacity (charge storage density). Consequently, in one exemplary example of the present teachings, lithium ion cells designed for electric power tools can be used as the rechargeable battery(ies) of the battery pack, and lithium ion cells designed for notebook PCs can be used as the rechargeable battery(ies) of the first charger.

In addition or in the alternative, the electric power tool system preferably further comprises a second charger adapted or configured to charge the rechargeable battery(ies) housed in the first charger. In a further preferred embodiment, the second charger is also capable of charging the battery pack.

Furthermore, the aforementioned second charger is preferably independent of the first charger and detachably attached to the first charger. However, the second charger also may be integral with the first charger and housed in the housing of the first charger.

In embodiments, in which the first charger includes a first unit that houses the rechargeable battery, and a second unit having an interface for the battery pack, which second unit is detachably attached to the first unit, the first unit is preferably detachably attached to the second charger while the first unit is detached from the second unit. With such a construction, the battery pack can be charged by attaching a fully charged first unit to the second unit while another first unit is detached from the second unit and is being charged. By sharing the second unit with the plurality of first units, the construction of the overall system can be simplified.

In addition or in the alternative, the first charger may be detachably attached to the tool main body instead of the battery pack, and may supply electric current from its rechargeable battery(ies) to the tool main body. With such a construction, the first charger can be used as a power source for the tool main body, similar to the battery pack.

In the aforementioned embodiment, the first charger preferably includes a first unit that houses the rechargeable battery, and a second unit that has an interface for the battery pack. In this case, the first unit and the second unit are preferably detachably attached to each other, and that the first unit can be detachably attached to the tool main body while the second unit is detached from the first unit. With such a construction, when the first charger is attached to the tool main body instead of the battery pack and the first charger is used as a power source, the portion not used as an interface with the battery pack can be detached. In this way, the size and weight of an electric power tool constructed with a tool main body and a first charger can be reduced. In addition, with this construction, the first unit may include a conventional battery pack, and the first charger can be achieved by preparing only a second unit.

The present teachings can be applied to any type of cordless electric power tool, including but not limited to electric power tools for processing metals, electric power tools for processing wood, electric power tools for processing stone, and electric power tools for gardening. Specific examples include, but are not limited to, electric drills, electric impact and screw drivers, electric impact wrenches, electric grinders, electric circular saws, electric reciprocating saws, electric jig saws, electric band saws, electric hammers, electric cutters, electric chain saws, electric planers, electric nailers (including electric rivet guns), electric staplers, electric shears, electric hedge trimmers, electric lawn clippers, electric lawn mowers, electric brush cutters, electric blowers (leaf blowers), electric flashlights, electric concrete vibrators and electric vacuum cleaners.

Rechargeable batteries housed within the battery pack and the first charger may preferably include, but are not limited to, at least one lithium-ion cell. The rechargeable battery (or a plurality of rechargeable batteries connected in series and/or in parallel) housed within the first charger may have the same nominal voltage as, or a different voltage from, the rechargeable battery(ies) housed within the battery pack. In addition, the rechargeable battery(ies) housed within the first charger and the rechargeable battery(ies) housed within the battery pack may be the same type of rechargeable batteries, or may be different types (e.g., the same or different chemistries and/or configurations) of rechargeable batteries.

The tool main body, the battery pack, the first charger, and the second charger may be directly attachable to each other, or may be attachable via an adapter. In addition, these items may be electrically connectable via contact terminals, or in a contactless method (e.g., electromagnetic induction using one or more coils).

Representative, non-limiting examples of the present teachings will now be described in further detail with reference to the attached drawings. This detailed description is merely intended to teach a person of skill in the art further details for practicing preferred aspects of the present teachings and is not intended to limit the scope of the teachings. Furthermore, each of the additional features and teachings disclosed below may be utilized separately or in conjunction with other features and teachings to provide improved power tool systems, as well as methods for using and manufacturing the same.

Moreover, combinations of features and steps disclosed in the following detail description may not be necessary to practice the teachings in the broadest sense, and are instead taught merely to particularly describe representative examples of the teachings. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment 1

An electric (cordless) power tool system of Embodiment 1 will be described with reference to the drawings. The electric power tool system of the present embodiment is a hand-held electric screwdriver and can be used, e.g., to drive screws both into and out of an object. However, the technology described in the present embodiment is not limited to electric screwdrivers, and can also be applied in the same manner to a wide variety of other types of electric power tools, such as the above-described electric power tools, or even other electric power tools that are not specifically mentioned herein.

Figure 2:
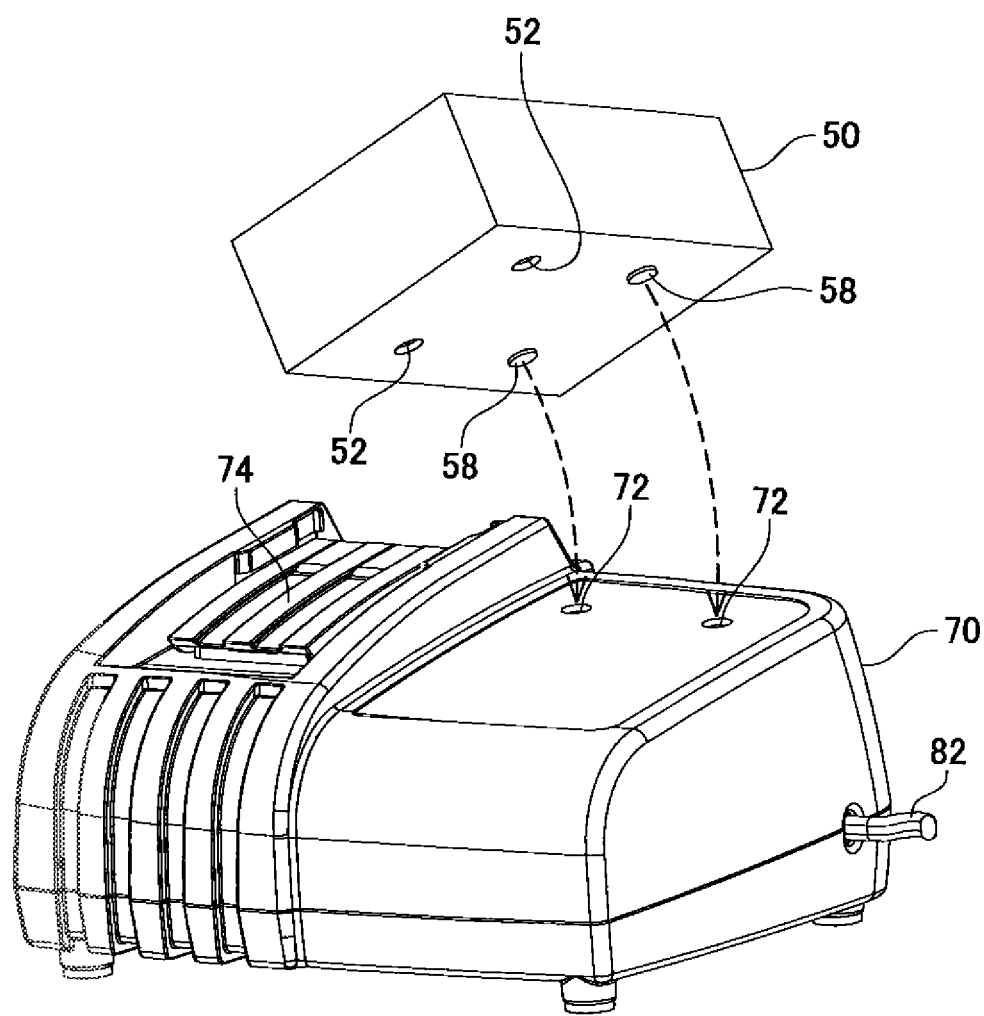
FIG. 2 shows an AC charger configured to charge the cordless charger of Embodiment 1.
Figure 3:
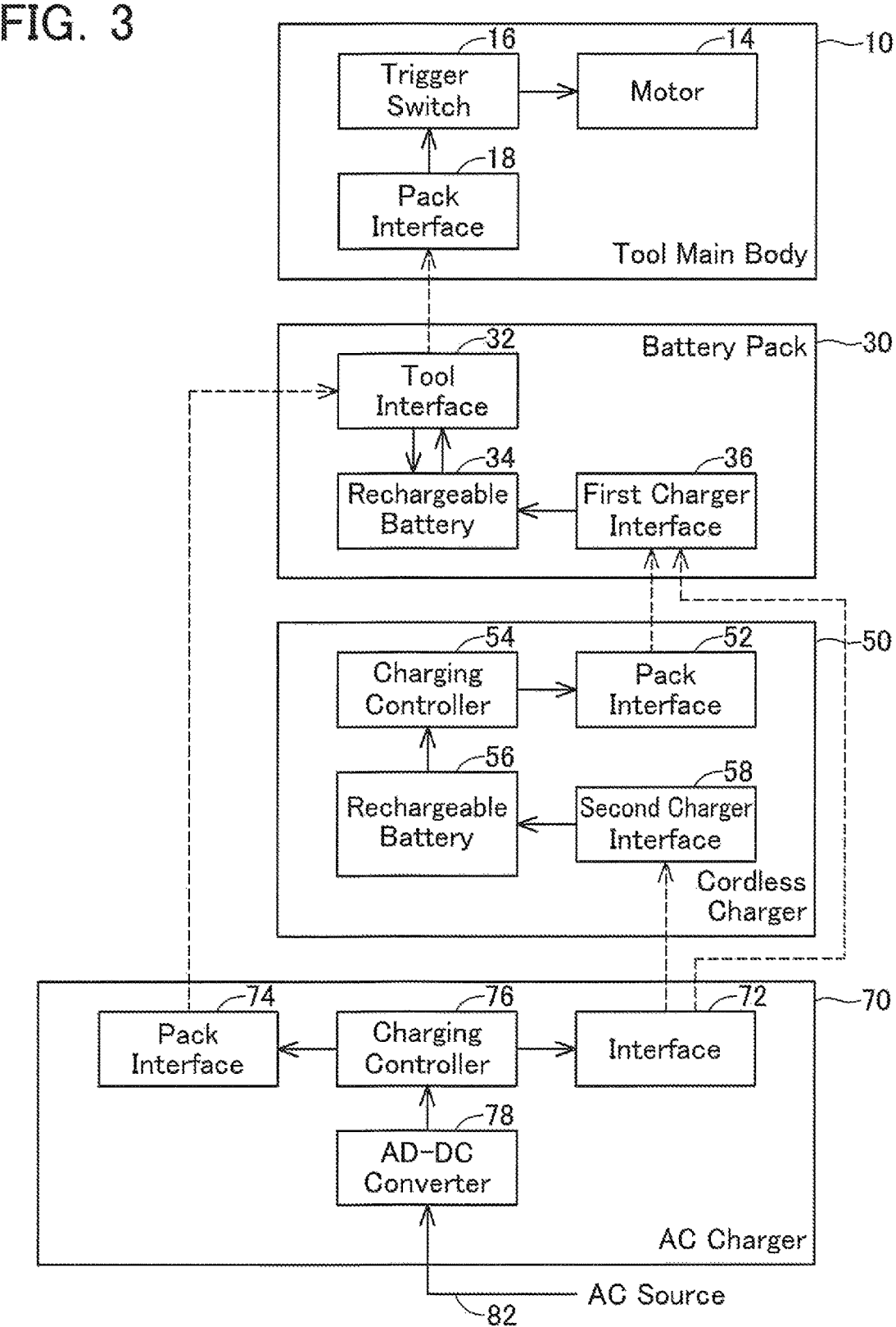
FIG. 3 is a block diagram that shows the construction and functional elements of the electric power tool system of Embodiment 1. In this drawing, connections shown with broken lines indicate detachable attachments between components, and the arrows show the direction of the current flow.

As shown in FIGS. 1 to 3, the electric power tool system comprises a tool main body 10, a battery pack 30, a cordless charger 50 and an AC charger 70.

The tool main body comprises a tool holder 12, a motor 14, a trigger switch 16 and a battery pack interface 18. The tool holder 12 is rotatably supported and constructed so that a screwdriver bit (a tool) can be detachably attached thereto. The tool holder 12 may be, e.g., a tool chuck. The output of the motor 14 is coupled to the tool holder 12 so as to rotatably drive the tool holder 12. In other types of electric power tools, the tool holder 12 or the tool may be driven by a solenoid instead of or together with the motor 14. The trigger switch 16 is manually operable by a user. For example, when the user manually operates or actuates the trigger switch 16, the motor 14 drives the tool holder 12, and when the user releases the trigger switch 16, the motor 14 stops driving the tool holder 12. The battery pack interface 18 detachably receives (attaches to) the battery pack 30. The battery pack interface 18 is electrically connected to the motor 14 via the trigger switch 16. The battery pack interface 18 comprises at least one battery (contact) terminal and also optionally at least one (contact) port for electrical communications with a processor and/or controller disposed in the tool main body 10 and/or in the battery pack 30, as is well known in the art.

The battery pack 30 is the power source for the tool main body 10 and is detachably attached to the tool main body 10. The battery pack 30 comprises a tool interface 32, a rechargeable battery 34 and a first charger interface 36. The tool interface 32 electrically connects with the battery pack interface 18 of the tool main body 10 when the battery pack 30 is attached to the battery pack interface 18 of the tool main body 10. The tool interface 32 is connected to the rechargeable battery 34 and conducts electric current from the rechargeable battery 34 to the tool main body 10. Similar to the battery pack interface 18, the tool interface 32 comprises at least one (contact) battery terminal (that is compatible with the at least one (contact) battery terminal of the battery pack interface 18) and also optionally at least one (contact) port for electrical communications with a processor and/or controller disposed in the tool main body 10 and/or in the battery pack 30, as is well known in the art. In the present embodiment, the tool interface 32 of the battery pack 30 may be disposed within the tool main body 10, and thereby hidden by the tool main body 10 when the battery pack 30 is attached to the tool main body 10. The rechargeable battery 34 of the battery pack 30 preferably is a lithium ion rechargeable battery. However, the rechargeable battery 34 is not limited to a lithium ion rechargeable battery, and may be any other type of rechargeable battery, such as other types of lithium-based batteries, nickel-metal hydride batteries, nickel cadmium batteries, etc. As will be readily understood, all references to a "battery" in the present application are intended to also disclose and encompass a plurality of batteries, as rechargeable batteries may be connected in series and/or parallel in order to achieve any arbitrary voltage and/or current required for a particular application of the present teachings.

Figure 4:
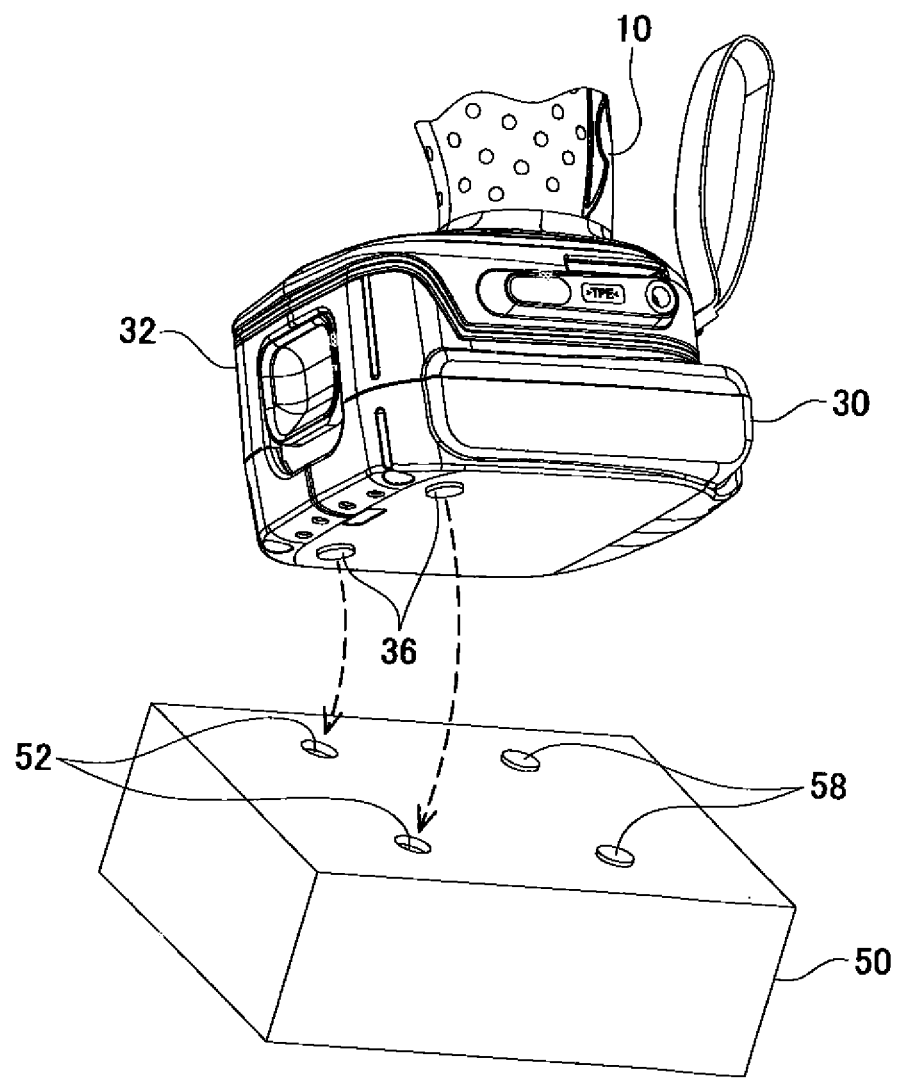
FIG. 4 shows a battery pack configured to be charged by the cordless charger.

The first charger interface 36 of the battery pack 30 may include a pair of positive and negative (contact) terminals that are electrically connectable (i.e. directly connectable in a contacting manner) with the cordless charger 50. As shown in FIG. 4, the first charger interface 36 is preferably disposed on the bottom of the battery pack 30, although it may also be disposed on a lateral side of the battery pack 30. It is preferable that the first charger interface 36 always remains exposed to the outside or is externally accessible even when the battery pack 30 is attached to the tool main body 10. Generally speaking, the top side of the battery pack 30 is physically engaged with the battery pack interface 18, which is disposed on a bottom face of the tool main body 10, when the battery pack 30 is attached to the battery pack interface 18 of the tool main body 10. Therefore, when the battery pack 30 is attached to the battery pack interface 18 of the tool main body 10, the lateral and bottom sides of the battery pack 30 are normally exposed to the outside. However, in case a lateral or bottom side of the battery pack 30 attaches to the battery pack interface 18, then the top side of the battery pack 30 may be exposed to the outside and thus may be suitable for disposing the first charger interface 36 thereon.

The cordless charger 50 configured to charge the battery pack 30. The cordless charger 50 comprises a battery pack interface 52, a charging controller 54, at least one rechargeable battery 56 and a second charger interface 58. The battery pack interface 52 may include a pair of positive and negative (contact) terminals that are electrically and detachably connectable (i.e. directly connectable in a contacting manner) with the first charger interface 36. The battery pack interface 52 is electrically connected to the rechargeable battery 56 via the charging controller 54. The rechargeable battery 56 of the cordless charger 50 preferably is a lithium ion rechargeable battery. However, the rechargeable battery 56 is not limited to a lithium ion rechargeable battery, and may be any other type of rechargeable battery, such as other types of lithium batteries, nickel-metal hydride batteries, nickel cadmium batteries, etc. As was discussed above, a plurality of batteries may be utilized by connecting them in series and/or parallel.

In the present embodiment, the cordless charger 50 charges the rechargeable battery 34 of the battery pack 30 using energy stored in the rechargeable battery 56. In the present embodiment, the charging current and charging voltage supplied to the battery pack 30 are preferably controlled by the charging controller 54, although the charging current and charging voltage could also be controlled, either solely or in combination, by a controller disposed in the battery pack 30 and/or even in the tool main body 10. The cordless charger 50 of the present embodiment does not require an external power supply (e.g., a wall socket) to charge the battery pack 30 (i.e. the cordless charger 50 may be disconnected from a separate power source during charging of the battery pack 30). The rechargeable battery 56 is electrically connected to the second charger interface 58. The second charger interface 58 preferably includes a pair of positive and negative (contact) terminals that are electrically and detachably connectable with the AC charger 70. The second charger interface 58 optionally may also include at least one (contact) port for electrical communications with a processor and/or controller disposed in the tool main body 10 and/or in the battery pack 30, as is well known in the art.

The AC charger 70 is configured to charge the at least one rechargeable battery 56 of the cordless charger 50, but optionally may be configured to also directly charge the rechargeable battery(ies) 34 of the battery pack 30, as will be further described below. The AC charger 70 comprises a first charger interface 72, a battery pack interface 74, a charging controller 76, an AC-DC converter 78 and a power cord 82. The power cord 82 is electrically connectable to an external AC power source (e.g., to a wall socket connected to a commercial AC power source or to a portable generator). The AC current supplied from the AC power source is converted into DC power by the AC-DC converter 78. The AC-DC converter 78 is electrically connected to the first charger interface 72 and to the battery pack interface 74 via the charging controller 76. Thus, the AC charger 70 is preferably configured to receive AC power from the external AC power source and to output a DC power from the first charger interface 72 as well as optionally from the battery pack interface 74. The first charger interface 72 and the battery pack interface 74 each preferably comprises at least one appropriately-configured (contact) battery terminal and also optionally at least one (contact) port for electrical communications with a processor and/or controller disposed in the tool main body 10 and/or in the battery pack 30, as is well known in the art.

Figure 5:
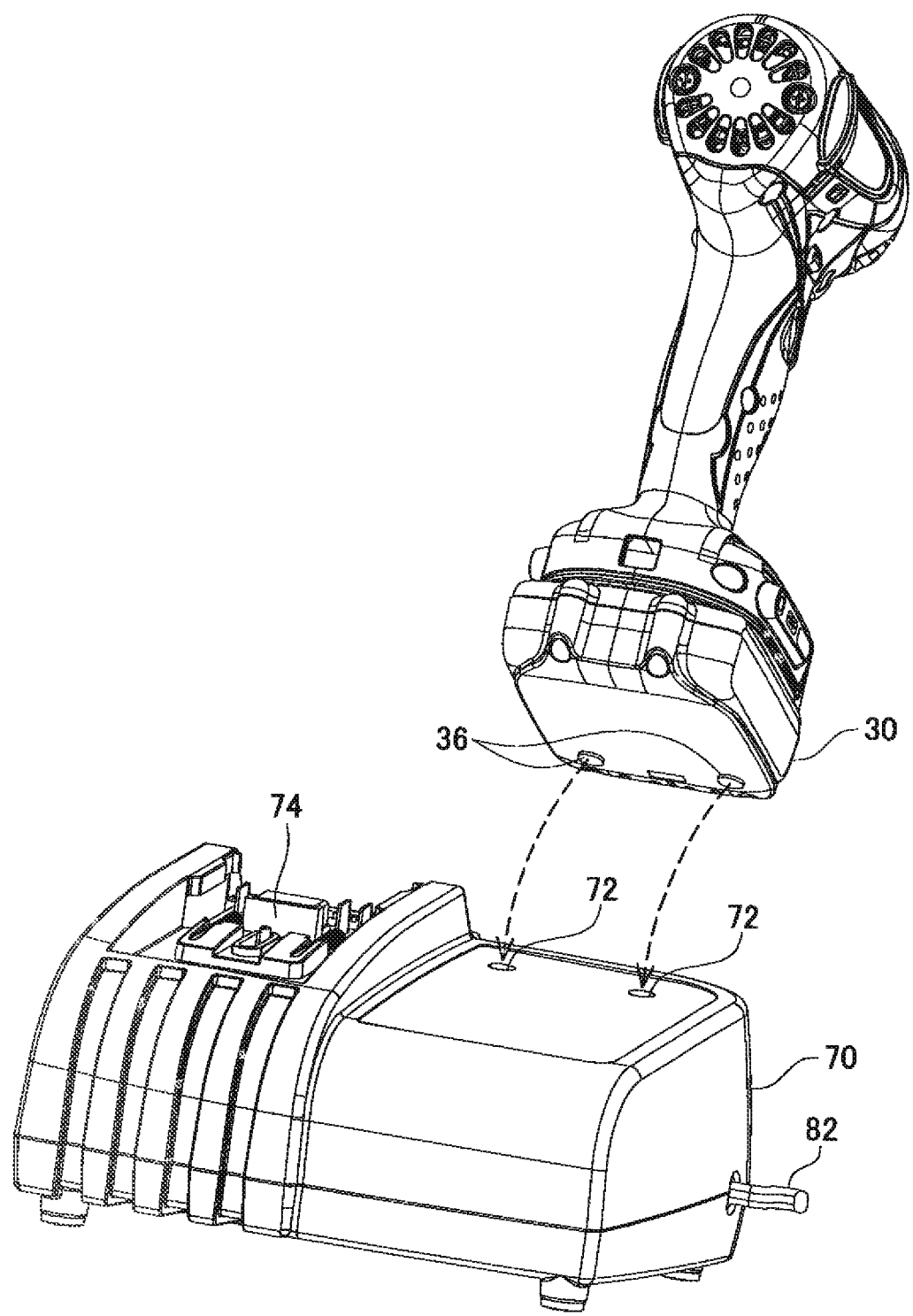
FIG. 5 shows the battery pack attached to the tool main body that will be charged by the cordless charger.
Figure 6:
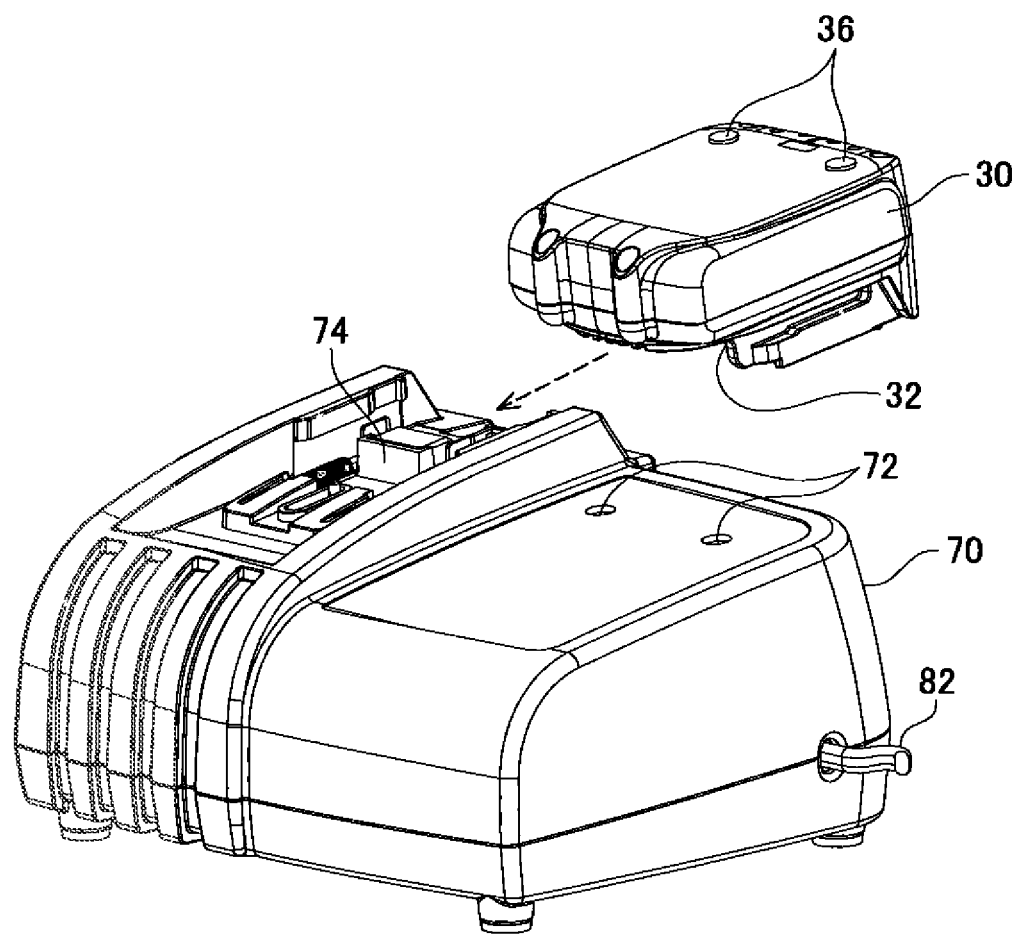
FIG. 6 shows the battery pack detached from the tool main body that will be charged by the AC charger.

As shown in FIG. 2, the first charger interface 72 of the AC charger 70 preferably may include a pair of positive and negative terminals that are electrically and detachably connectable (i.e. directly connectable) with corresponding or complementary positive and negative (contact) terminals of the second charger interface 58 of the cordless charger 50. In addition, as shown in FIG. 5, the first charger interface 72 is electrically and detachably connectable with the first charger interface 36 of the battery pack 30. In other words, the AC charger 70 of this embodiment is configured to charge both the rechargeable battery 56 of the cordless charger 50 and the rechargeable battery 34 of the battery pack 30. Furthermore, as shown in FIG. 6, the tool interface 32 of the battery pack 30 is also attachable to the battery pack interface 74 of the AC charger 70. Thus, the AC charger 70 of this embodiment can charge the battery pack 30 via the battery pack interface 74 or via the first charger interface 72. However, it should be understood that the AC charger 70 may be configured to charge only the rechargeable battery 56 of the cordless charger 50, and need not be capable of charging the rechargeable battery 34 of the battery pack 30. That is, in such an embodiment, the rechargeable battery 34 of the battery pack 30 may be charged by the rechargeable battery 56 of the cordless charger 50 or a conventional charger.

As noted above, the electric power tool system of the present embodiment includes the cordless charger 50 that houses the rechargeable battery 56, such that the user can charge the battery pack 30 without requiring an external power source. For example, the cordless charger 50 is preferably portable and may be placed by the user near to the location where the user is performing power tool operations, so that the electric power tool system (i.e. the first charger interface 36) can be conveniently set on (or otherwise connected with) the cordless charger 50 (i.e. the battery pack interface 52) between power tool operations, thereby enabling frequently charging of the battery pack 30. Thus, even if the charge storage capacity of the battery pack 30 (at least one rechargeable battery 34) is relatively small, it still may be possible to avoid completely depleting the battery pack 30 while alternately performing power tool operations and recharging the battery pack 30 (i.e. between power tool operations), such that the depleted battery pack 30 would have to be replaced with a freshly-charged battery pack 30 in order to continue the power tool operations. Generally speaking, lower-capacity battery packs 30 have a smaller volume (smaller-sized) and weigh less, such that the overall weight of the electric power tool (tool main body 10 and the battery pack 30) can be reduced. Thus, by using a lighter-weight battery pack, the electric power tool can be made less burdensome to hold up for the user, thereby advantageously making usage of the power tool system easier and less fatiguing.

In the present embodiment, the battery pack 30 is chargeable by the cordless charger 50 while the battery pack 30 is attached to the tool main body 10. According to such a construction, there is no need to detach the battery pack 30 from the tool main body 10 when the user wants to charge the battery pack 30. As a result, the user can very conveniently charge the battery pack 30 between power tool operations. However, in certain aspects of the present teachings, it is not necessary for the cordless charger 50 to be capable of charging the battery pack 30 while it is attached to the tool main body 10. In other words, the cordless charger 50 may instead be capable of charging the battery pack 30 only while the battery pack 30 is detached from the tool main body 10, in a manner similar to conventional chargers.

In the present embodiment, the charge storage capacity of the rechargeable battery 56 housed in the cordless charger 50 is larger or larger than the charge storage capacity of the rechargeable battery 34 housed in the battery pack 30. Such an embodiment of the present teachings is particularly convenient for the user, because the overall size and weight of the electric power tool (the tool main body 10 and the battery pack 30) can be reduced by utilizing a lighter-weight battery pack. However, because the battery pack 30 can be frequently recharged using the cordless charger 50, the electric power tool is capable of performing a relatively large amount of work before it becomes necessary to recharge the rechargeable battery 56 of the cordless charger 50. That is, the power tool system may be operated much longer before the battery pack 30 must be recharged than would normally be expected.

In addition, in the present embodiment, the lithium ion battery(ies) used for the rechargeable battery 34 of the battery pack 30 may preferably have different properties (e.g., a different chemistry and/or configuration) than the rechargeable battery(ies) 56 of the cordless charger 50. For example, the rechargeable battery 34 of the battery pack 30 preferably utilizes a lithium ion rechargeable battery that has been specially developed and designed for use in electric power tools, i.e. a rechargeable battery having a relatively high maximum rated or nominal current output, so that heavy duty power tool operations can be performed using the battery pack 30. On the other hand, the rechargeable battery 56 of the cordless charger 50 may utilize, e.g., a lithium ion rechargeable battery specially developed or designed for use in notebook personal computers (PCs), which has a lower maximum rated or nominal current output, but has a higher charge storage density. Because the battery charging operation is typically performed using a much smaller current than a power tool operation, the at least one rechargeable battery 56 of the cordless charger 50 can utilize a battery chemistry and/or configuration that minimizes weight and size while maintaining a relatively high charge storage capacity. As a result, the cordless charger 50 can have a smaller weight and size (volume) overall without sacrificing stored charging power.

As compared to lithium ion rechargeable batteries for use in electric power tools, lithium ion rechargeable batteries for use in notebook PCs have a lower maximum allowable current, but advantageously have a large capacity relative to its size and weight. Accordingly, because the maximum current that flows to the rechargeable battery 56 may be relatively small according to the present teachings, lithium ion rechargeable batteries that are suitable for use in notebook PCs may be used in the cordless charger 50 of the present embodiment. In contrast, because a large amount of current needs to flow to the motor 14 during a power tool operation, lithium ion rechargeable batteries suitable for use in electric power tools must be used for the rechargeable battery 34 of the battery pack 30, so as to enable a relatively large current flow. Of course, the at least one rechargeable battery 56 of the cordless charger 50 is not limited to only lithium ion rechargeable batteries suitable for use in notebook PCs, and various other types of rechargeable batteries developed for other purposes can also be appropriately used with the present teachings.

In the present embodiment, the battery pack 30 is chargeable not only by the cordless charger 50, but also by the AC charger 70. For example, the AC charger 70 can be configured to charge the battery pack 30 while the battery pack 30 is attached to the tool main body 10 (see FIG. 5). Thus, when AC power (e.g., a wall socket) is readily available, the AC charger 70 can be used instead of the cordless charger 50 to charge the battery pack 30. For example, as was described above, the battery pack 30 (while attached to the tool main body 10) can be set on the AC charger 70 (in particular on the first charger interface 72) between power tool operations, thereby charging the battery pack 30 on a frequent basis and thus possibly avoiding a complete depletion of the charge stored in the battery pack 30 during a particular set of power tool operations.

As was described above, the AC charger 70 may also be configured charge the battery pack 30 when the battery pack 30 is detached from the tool main body 10 (see FIG. 6) by engaging the tool interface 32 with the battery pack interface 74. Thus, in such an embodiment, the AC (second) charger 70 could be used, e.g., to completely charge the battery pack 30 overnight while the electric power tool is not being used at all. In such a configuration, the AC charger 70 may preferably supply the battery pack 30 with a charging current that is larger than the charging current supplied by of the cordless charger 50. In this case, the battery pack 30 can be charged in a relatively short period of time.

Figure 7:
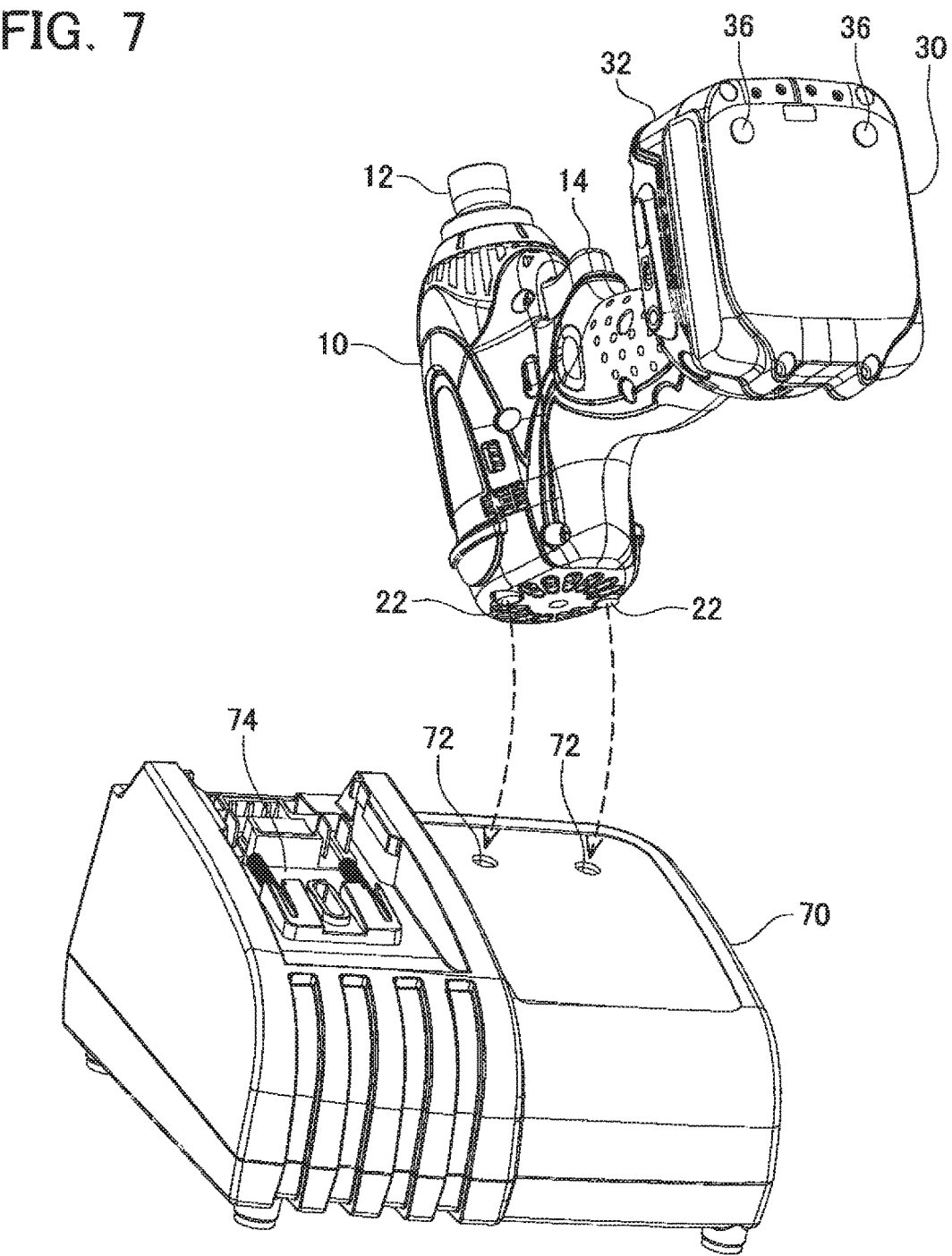
FIG. 7 shows a modification in which an interface for the cordless charger is provided on the tool main body.
Figure 8:
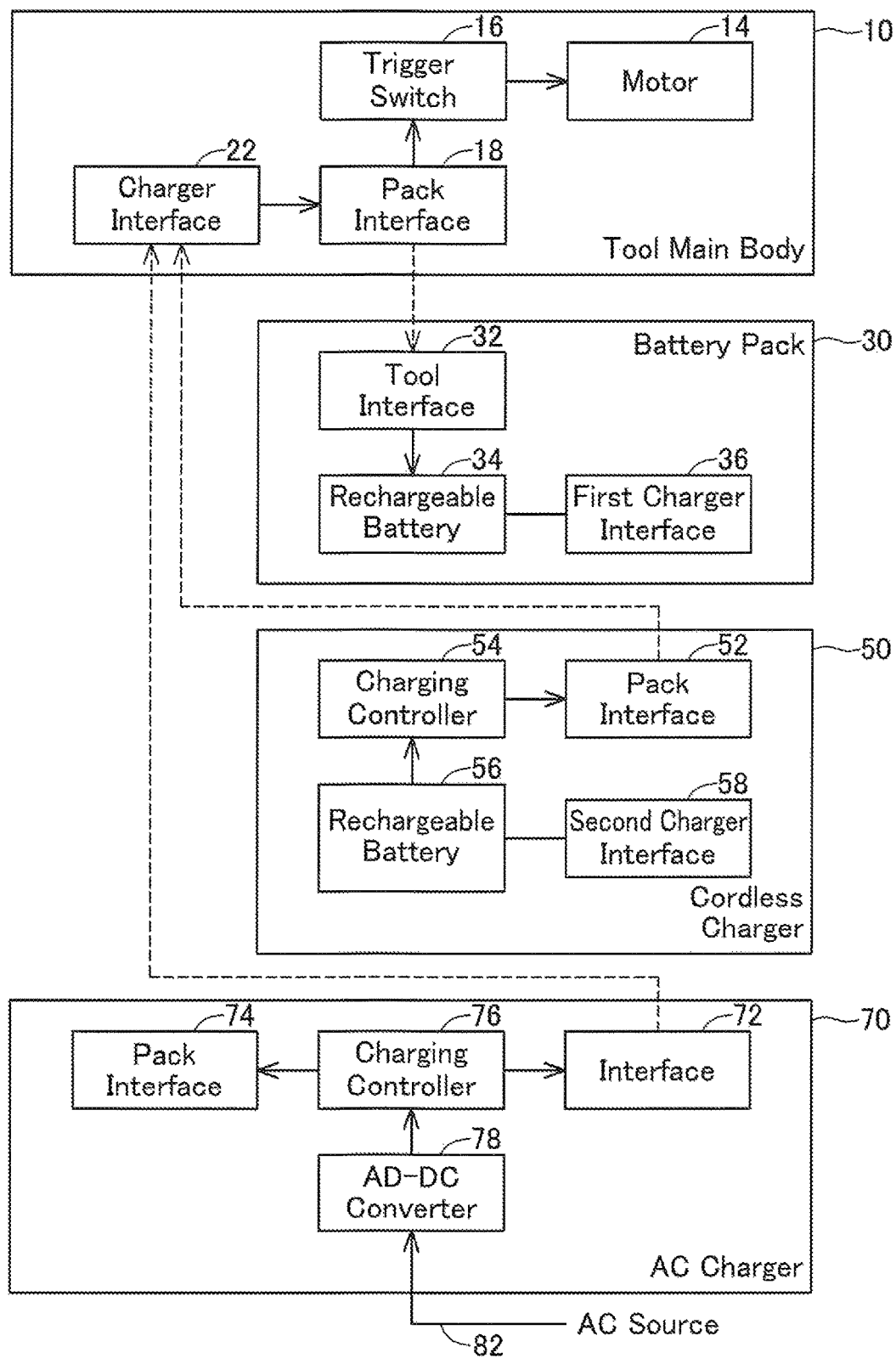
FIG. 8 shows a block diagram that shows the construction and functional elements of the modified embodiment shown in FIG. 7. Similar to FIG. 3, connections shown with broken lines indicate detachable attachments between components, and the arrows show the direction of the current flow.

FIGS. 7 and 8 show an alternative embodiment, in which a charger interface 22 is additionally provided on the tool main body 10. This charger interface 22 is electrically connectable with the battery pack interface 52 of the cordless charger 50 and/or with the first charger interface 72 of the AC charger 70 while the battery pack 30 is connected to the battery pack interface 18 of the tool main body 10. Similar to the other interfaces described above, the charger interface 22 also preferably comprises at least one appropriately-configured (contact) battery terminal and also optionally at least one (contact) port for electrical communications with a processor and/or controller disposed in the tool main body 10 and/or in the battery pack 30, as is well known in the art. In this embodiment, the charger interface 22 is electrically connected to the battery pack interface 18 within the tool main body 10. As a result, when the battery pack 30 is attached to the tool main body 10, the charger interface 22 of the tool main body 10 will be electrically connected to the at least one rechargeable battery 34 of the battery pack 30. This embodiment also enables the battery pack 30 to be charged by the cordless charger 50 or by the AC charger 70 while the battery pack 30 is attached to the tool main body 10.

Embodiment 2

Figure 9:
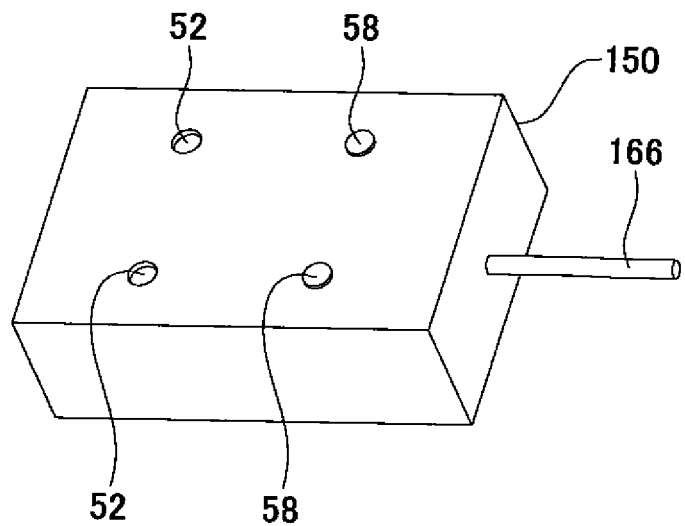
FIG. 9 shows a cordless charger according to Embodiment 2 of the present teachings, in which the cordless charger is capable of charging a rechargeable battery using an external power source.
Figure 10:
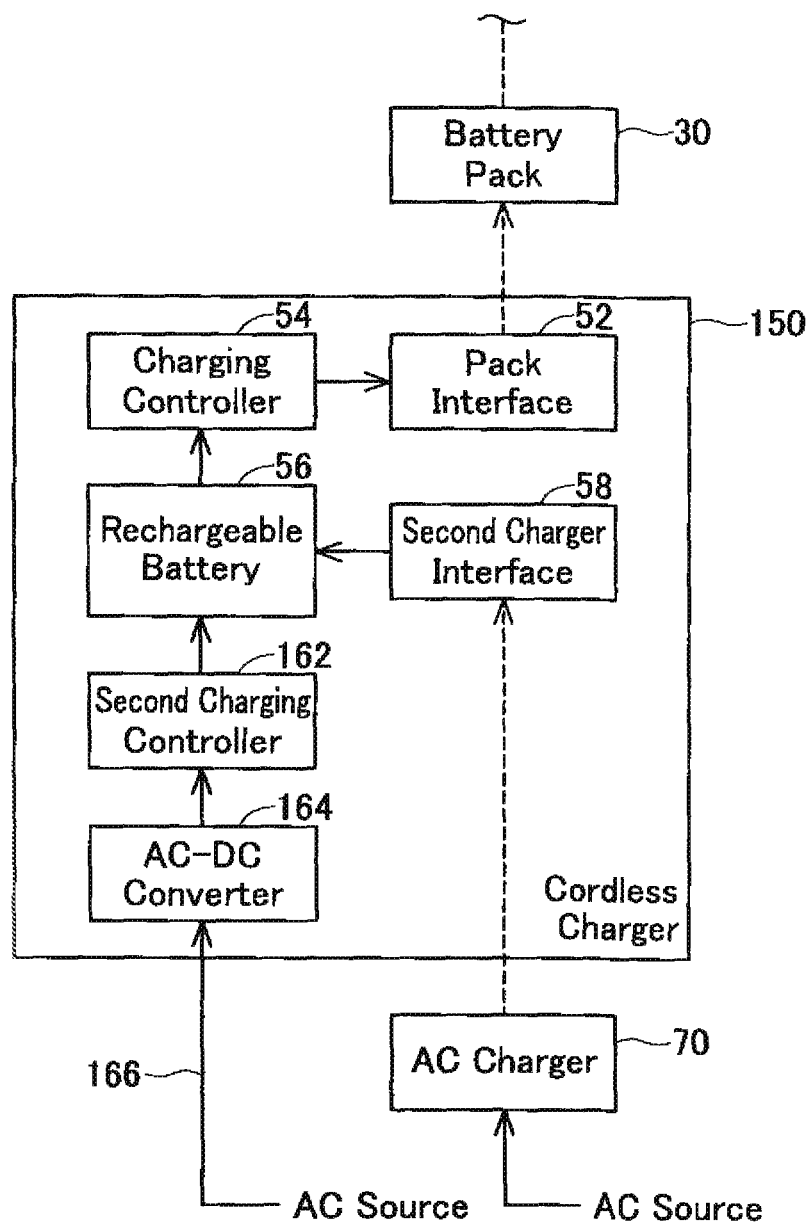
FIG. 10 is a block diagram that shows the construction and functional elements of the cordless charger of Embodiment 2. Similar to FIG. 3, connections shown with broken lines indicate detachable attachments between components, and the arrows show the direction of the current flow.

A cordless charger 150 of Embodiment 2 will be described with reference to FIGS. 9 and 10. The cordless charger 150 of Embodiment 2 charges the battery pack 30 described in Embodiment 1, and is a modification of the cordless charger 50 described in Embodiment 1. In FIGS. 9 and 10, components that are common with the cordless charger 50 of Embodiment 1 have been assigned the same reference numbers.

As shown in FIGS. 9 and 10, the cordless charger 150 of Embodiment 2 further comprises a second charging controller 162, an AC-DC converter 164 and a power cord 166, which are not provided in the cordless charger 50 of Embodiment 1. The power cord 166 is electrically connectable to an external AC power source (e.g., to a wall socket in electrical communication with a commercial AC power supply). The AC current supplied from the AC power source is converted into DC power by the AC-DC converter 164. The AC-DC converter 164 is electrically connected to the rechargeable battery 56 via the charging controller 162.

In such a construction, the cordless charger 150 of Embodiment 2 is capable of directly receiving AC power from the external AC power source, which can be utilized to charge the rechargeable battery 56. Of course, the rechargeable battery 56 of the cordless charger 150 can also be charged by the AC charger 70, which was described in Embodiment 1.

Embodiment 3

A cordless charger 250 of Embodiment 3 will be described with reference to FIGS. 11 to 15. The cordless charger 250 of Embodiment 3 charges the battery pack 30 described in Embodiment 1, and is a modification of the cordless charger 50 described in Embodiment 1. In FIGS. 12 to 15, components that are common with the cordless charger 50 of Embodiment 1 have been assigned the same reference numbers.

Figure 11:
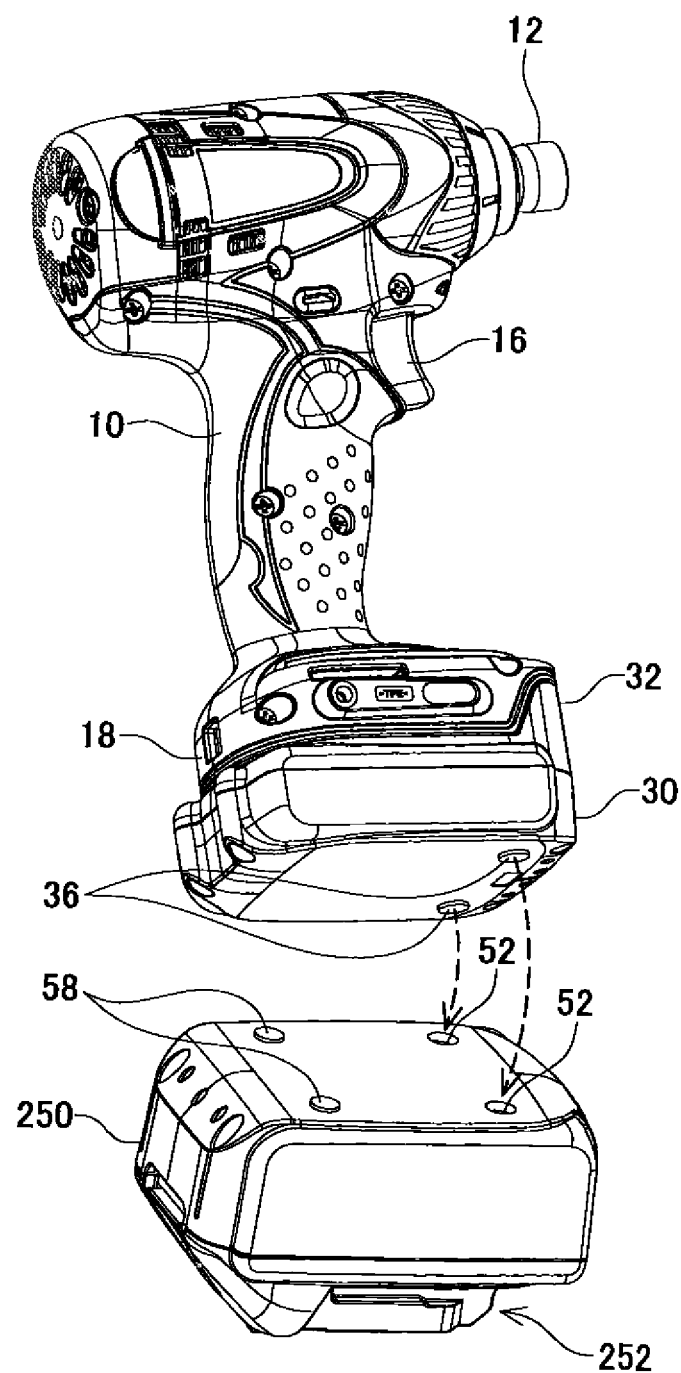
FIG. 11 shows a cordless charger according to Embodiment 3 of the present teachings, in which a battery pack attached to a tool main body will be charged by the cordless charger.
Figure 12:
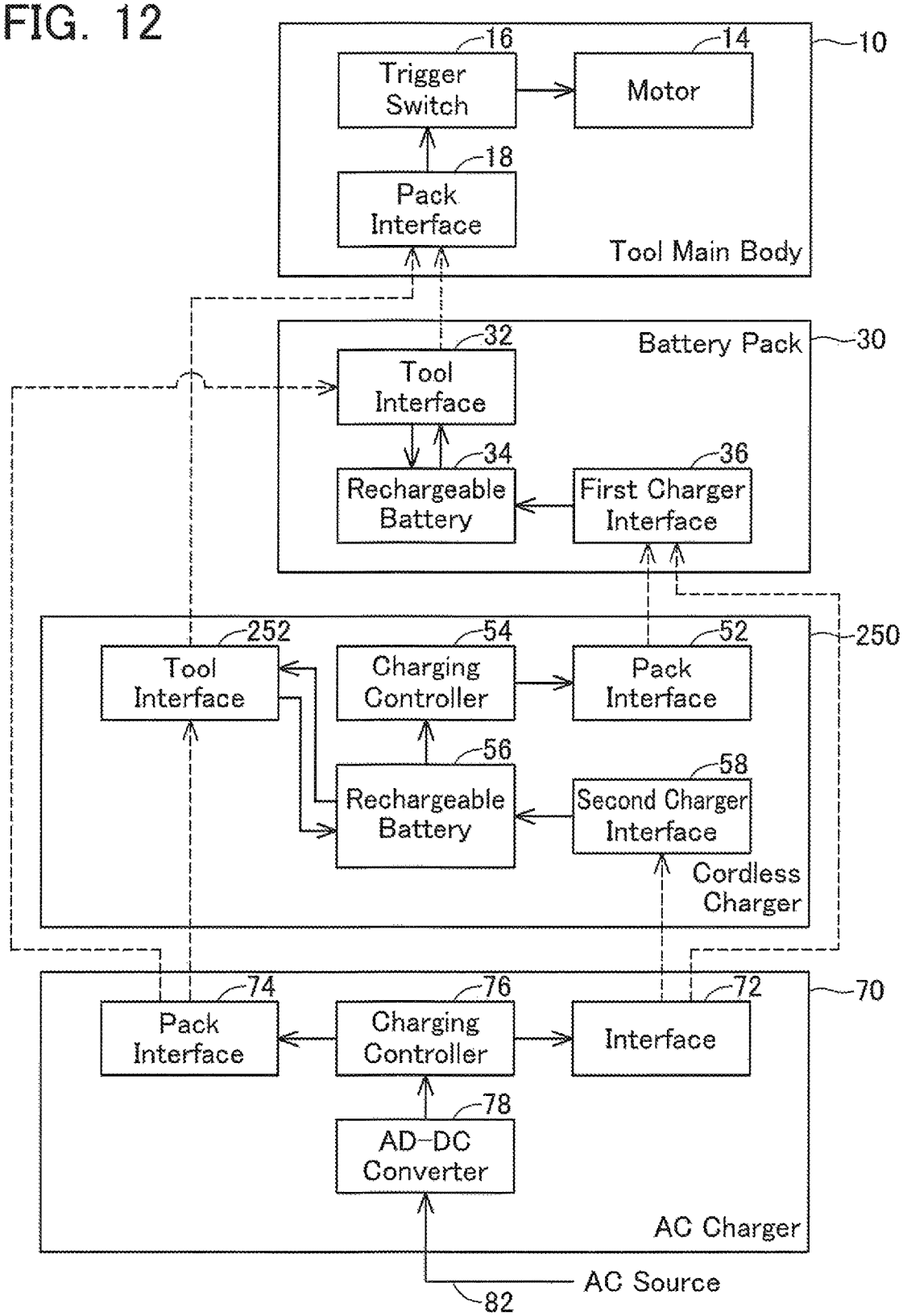
FIG. 12 is a block diagram that shows the construction and functional elements of an electric power tool system that includes the cordless charger of Embodiment 3. Similar to FIG. 3, connections shown with broken lines indicate detachable attachments between components, and the arrows show the direction of the current flow.
Figure 13:
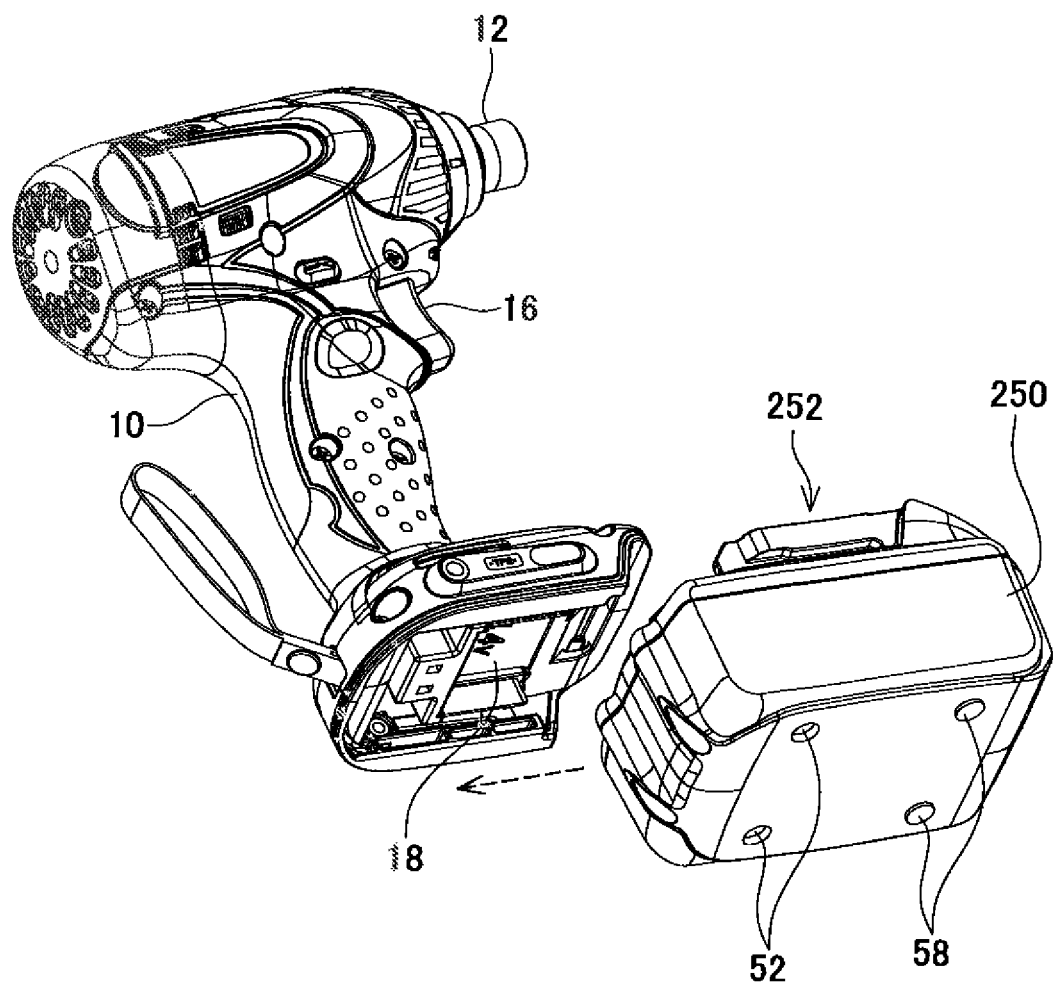
FIG. 13 shows the cordless charger of Embodiment 3 that is configured to be detachably attached to the tool main body in order to directly supply current to the tool main body.

As shown in FIGS. 11 and 12, the cordless charger 250 of Embodiment 3 further comprises a tool interface 252, which is not provided in the cordless charger 50 of Embodiment 1. The tool interface 252 is electrically connected to the rechargeable battery 56 inside the cordless charger 250. The tool interface 252 of the cordless charger 250 preferably has the same structure as the tool interface 32 of the battery pack 30, or at least has a structure that permits the tool interface 252 to be electrically connected to the battery pack interface 18 of the tool main body 10. Thus, such a configuration enables the cordless charger 250 to be attached to the tool main body 10 as shown in FIG. 13 instead of the battery pack 30 as shown in FIG. 11. When the cordless charger 250 is attached to the tool main body 10 as shown in FIG. 13, the tool interface 252 of the cordless charger 250 is electrically connected to the battery pack interface 18 of the tool main body 10. Consequently, the cordless charger 250 of the present embodiment can not only charge the battery pack 30, but can also serve as a power source for the tool main body 10 so as to directly supply current from the rechargeable battery 56 of the cordless charger 250 to the motor 14 of the tool main body 10 (i.e. without a battery pack 30 interleaved therebetween).

Figure 14:
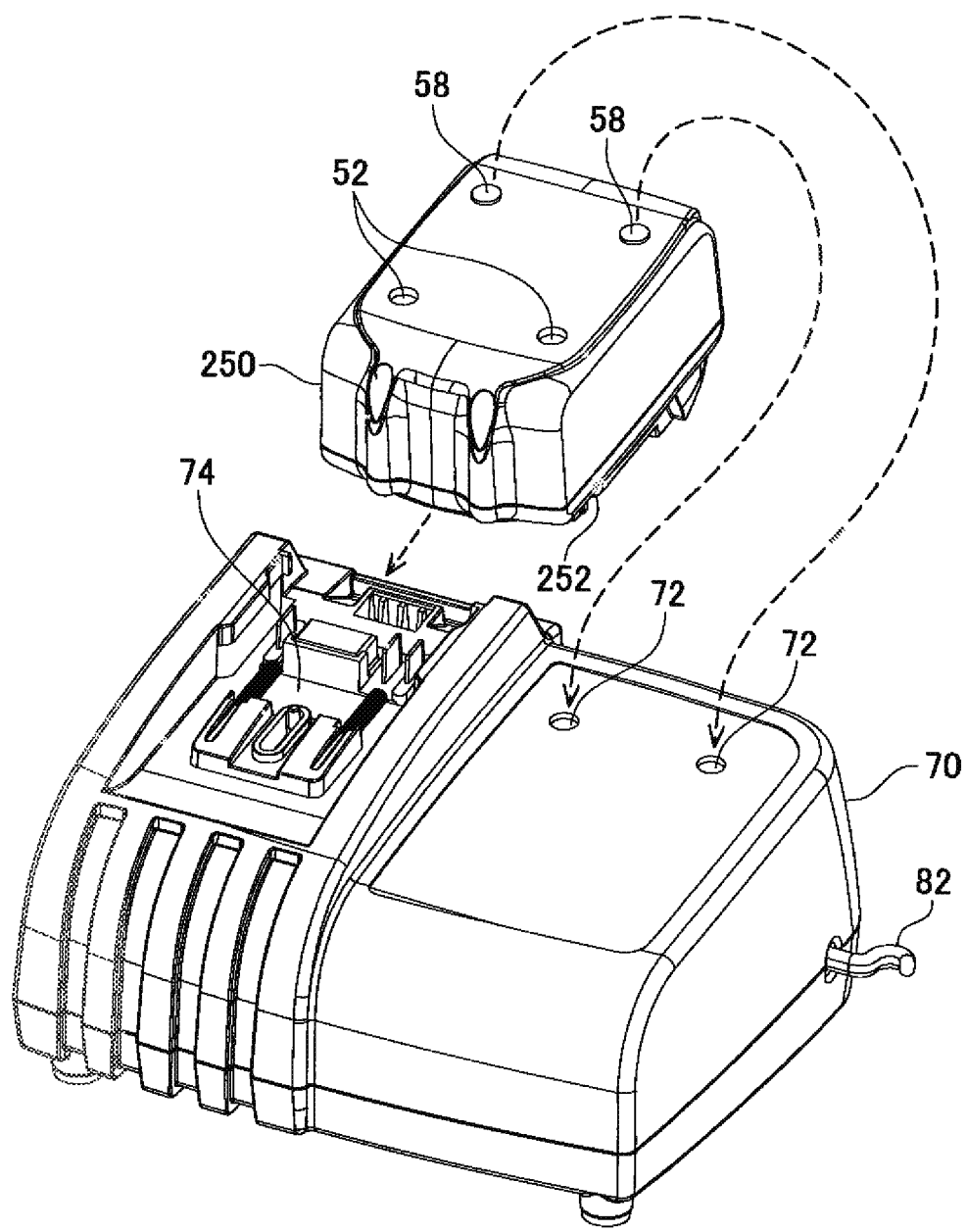
FIG. 14 shows the cordless charger of Embodiment 3 that is configured to be charged by an AC charger.
Figure 15:
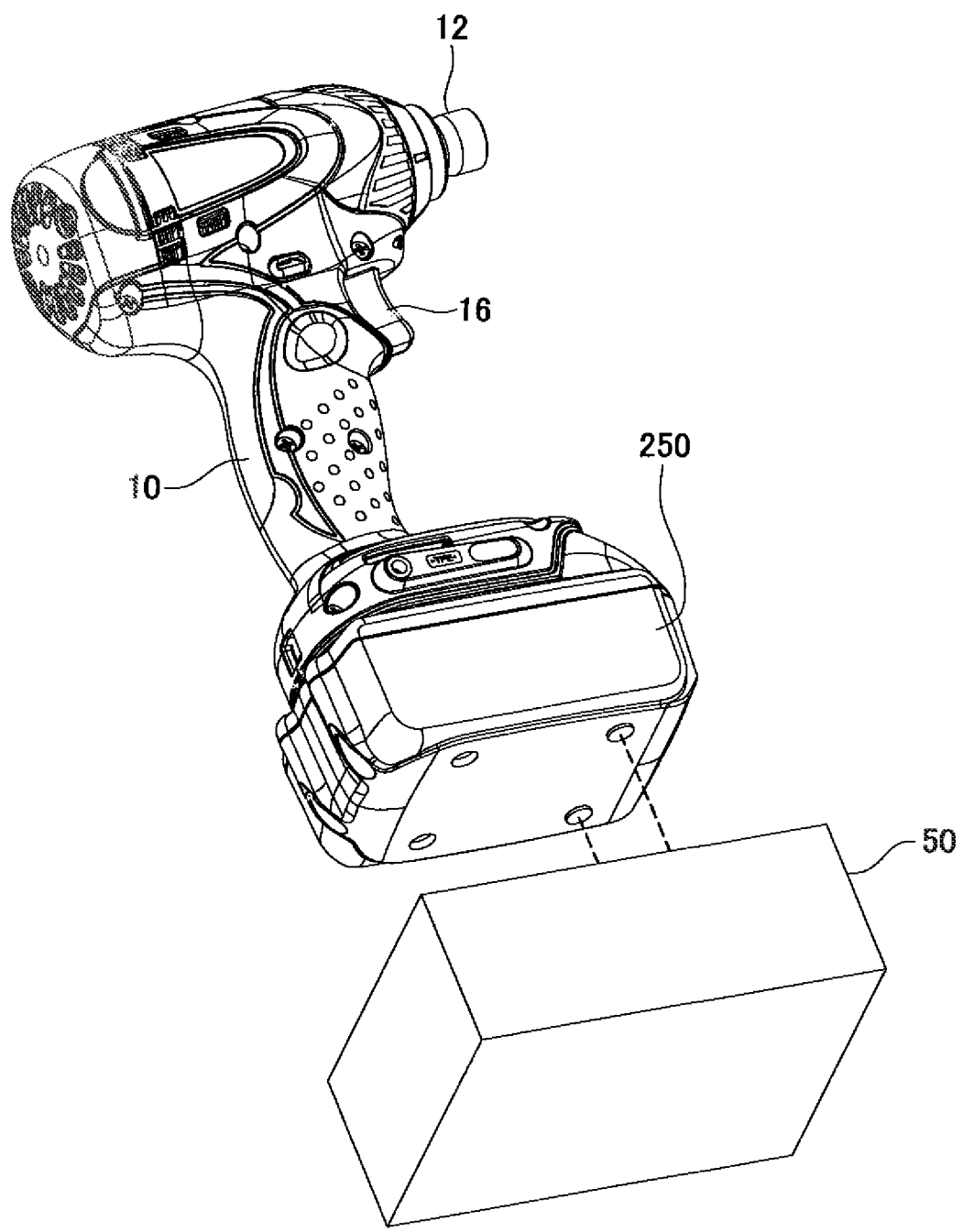
FIG. 15 shows the cordless charger of Embodiment 3 attached to the tool main body, wherein the cordless charger of Embodiment 3 is also configured be charged by the cordless charger of Embodiment 1.

As shown in FIG. 14, the cordless charger 250 of Embodiment 3 is chargeable by the AC charger 70. Thus, the AC charger 70 is configured to charge the cordless charger 250 either via the first charger interface 72 or via the battery pack interface 74. Furthermore, as shown in FIG. 15, the cordless charger 250 of Embodiment 3 can also be configured to be charged by the cordless charger 50 described in Embodiment 1. In this case, the cordless charger 250 is chargeable while it is attached to the tool main body 10.

Embodiment 4

Figure 16:
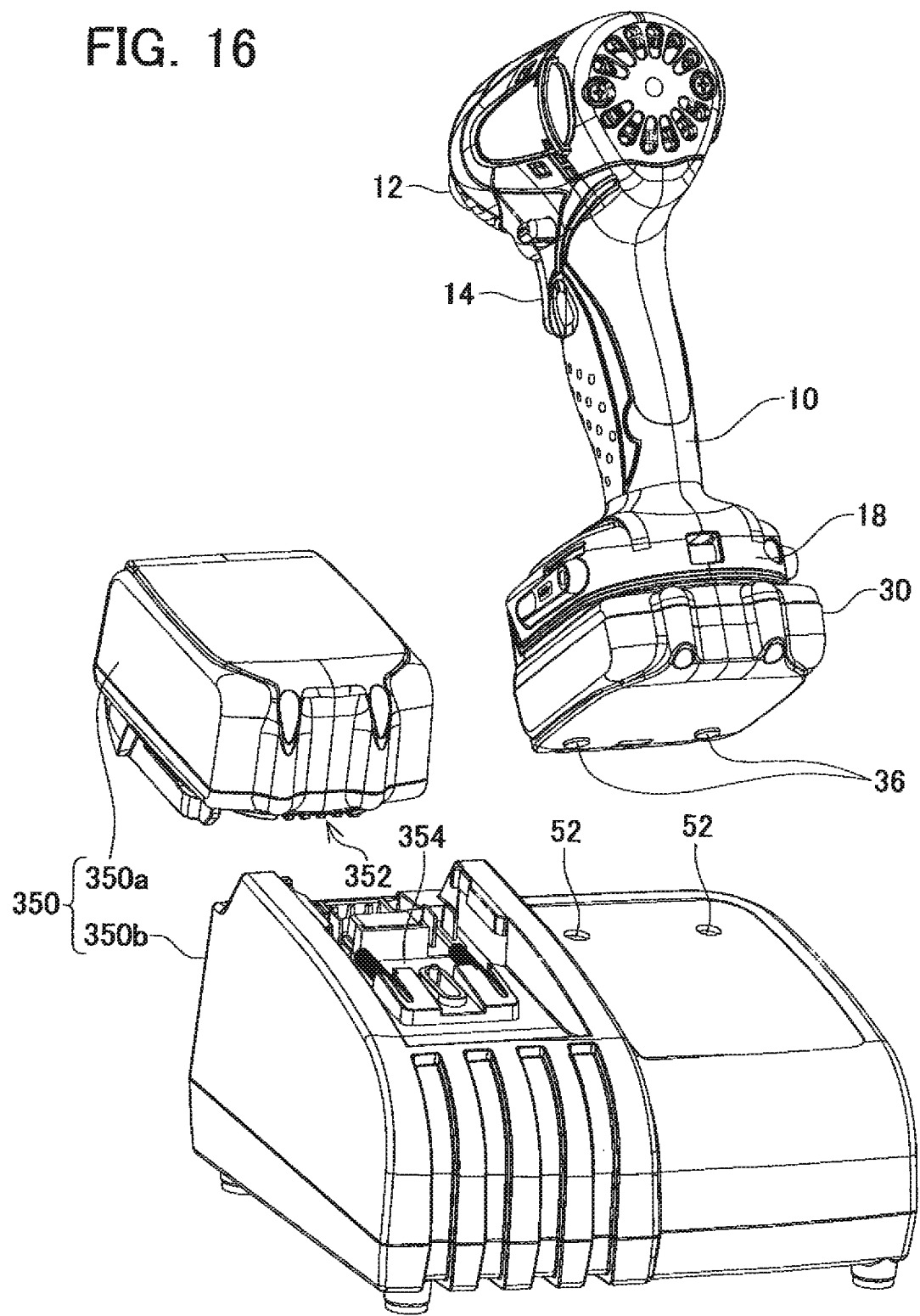
FIG. 16 shows a tool main body, a battery pack, and a cordless charger according to Embodiment 4 of the present teachings.
Figure 17:
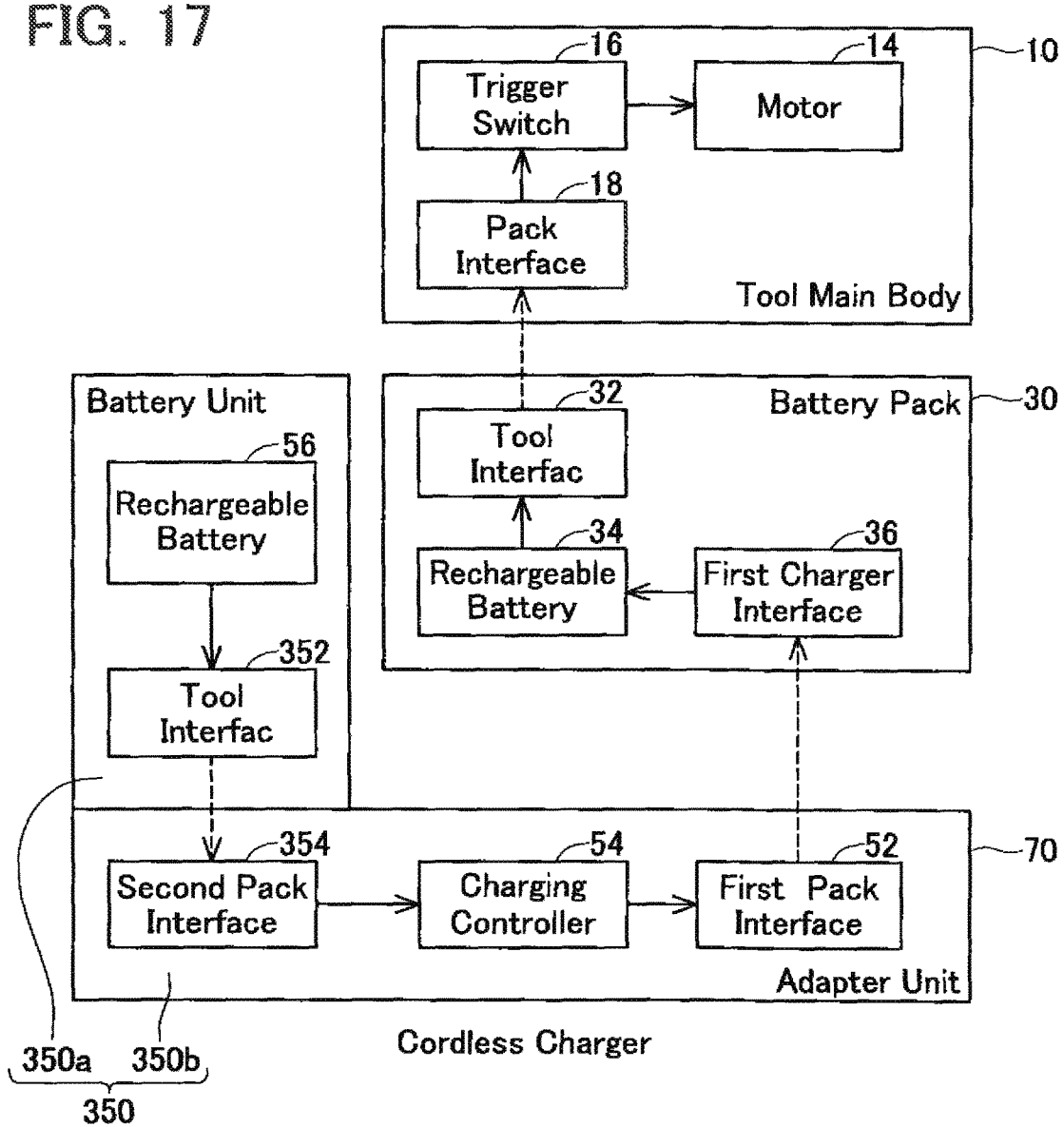
FIG. 17 is a block diagram that shows the construction and functional elements of an electric power tool system that includes the cordless charger of Embodiment 4. Similar to FIG. 3, connections shown with broken lines indicate detachable attachments between components, and the arrows show the direction of the current flow.

A cordless charger 350 of Embodiment 4 will be described with reference to FIGS. 16 and 17. The cordless charger 350 of Embodiment 4 charges the battery pack 30 described in Embodiment 1, and is a modification of the cordless charger 50 described in Embodiment 1. In FIGS. 16 and 17, components that are common with the cordless charger 50 of Embodiment 1 have been assigned the same reference numbers.

The cordless charger 350 of Embodiment 4 comprises a battery unit 350a detachably attached to an adapter unit 350b. The battery unit 350a comprises a tool interface 352 that is electrically connected to at least one rechargeable battery 56. In such an embodiment, the battery unit 350a may be a conventional battery pack designed to be directly attached to, and supply power for, the tool main body 10. Thus, the battery unit 350a can also be attached to the battery pack interface 18 of the tool main body 10 in order to serve as a power source that supplies current to the tool main body 10.

The adapter unit 350b comprises a first battery pack interface 52, a charging controller 54 and a second battery pack interface 354. Similar to the interfaces described above, the tool interface 352 and the second battery pack interface 354 each preferably comprises at least one battery (contact) terminal and also optionally at least one (contact) port for electrical communications with a processor and/or controller disposed in the tool main body 10 and/or in the battery pack 30 (350a), as is well known in the art. When the battery pack 30 is attached to the tool main body 10, the first charger interface 36 can be electrically connected to the first battery pack interface 52. A tool interface 352 of the battery unit 350a can be mechanically (directly) and electrically connected to the second battery pack interface 354. The second battery pack interface 354 may be electrically connected to the first battery pack interface 52 via the charging controller 54. According to this construction, the cordless charger 350 of the present embodiment is also configured to charge the battery pack 30 using power stored in the rechargeable battery 56. The housing used for the AC charger 70 described in Embodiment 1 may also be used as the housing for the adapter unit 350b.

With the cordless charger 350 of the present embodiment, the battery unit 350a that houses the rechargeable battery 56 can be separated from the rest of the structure. Thus, the separated battery unit 350a can be attached to the tool main body 10 instead of the battery pack 30, and can be used as the power source for the tool main body 10. According to this construction, when the cordless charger 350 is used as the power source for the tool main body 10, the structures that are not used, i.e., the second battery pack interface 52 and the charging controller 54, can be removed. In this way, the size and weight of an electric power tool constructed with the tool main body 10 and the cordless charger 350 can be reduced.

Embodiment 5

Figure 18:
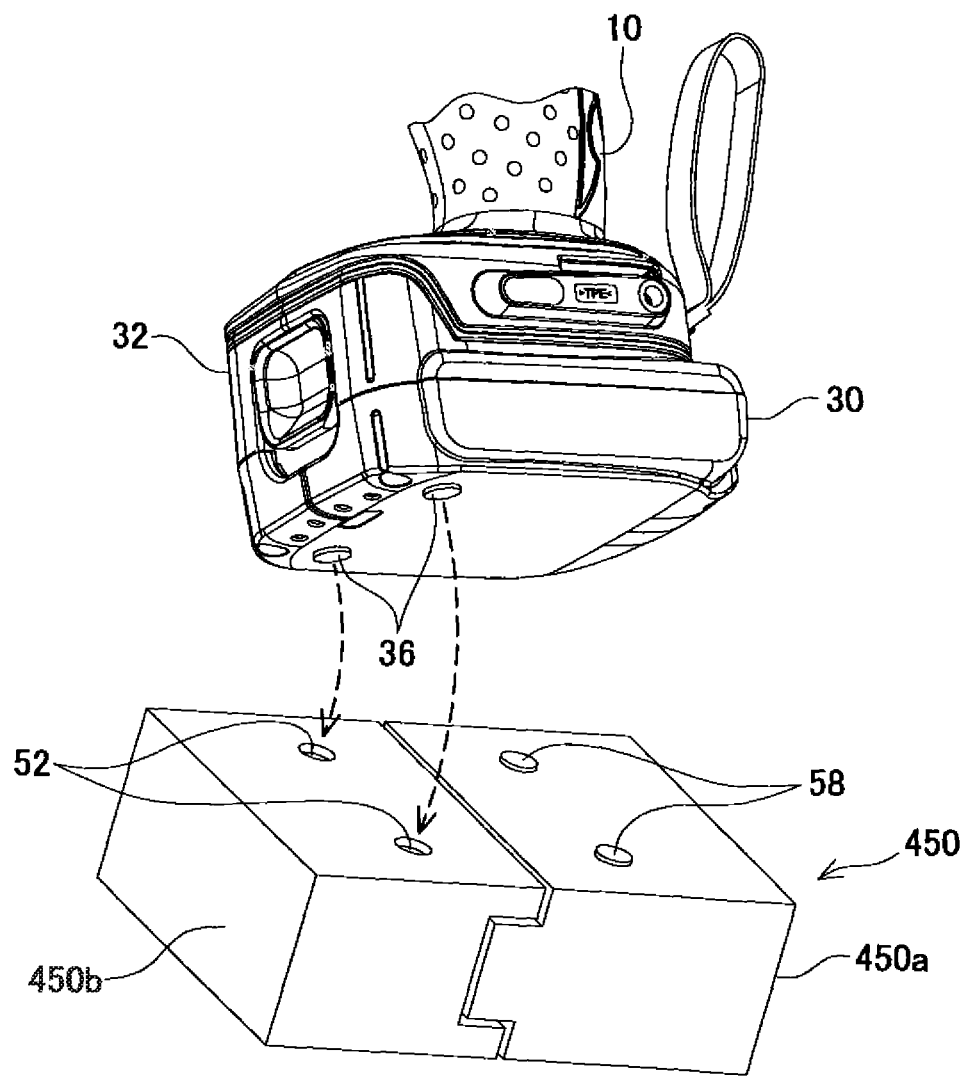
FIG. 18 shows a tool main body, a battery pack and a cordless charger according to Embodiment 5 of the present teachings.
Figure 19:
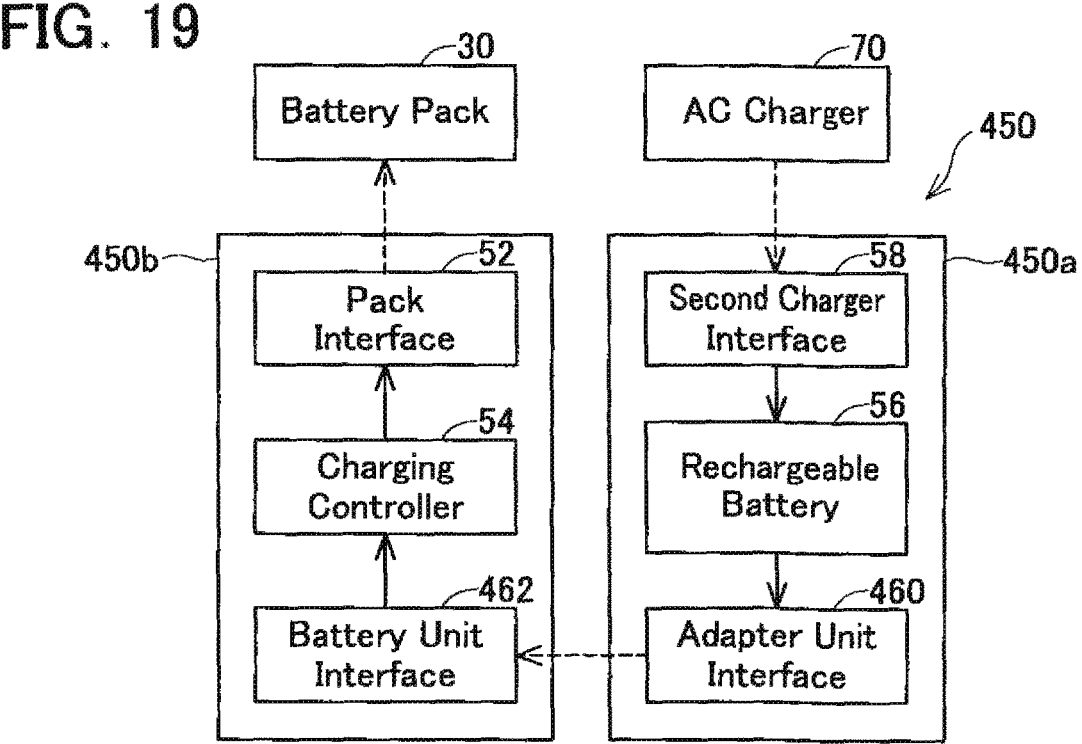
FIG. 19 is a block diagram that shows the construction and functional elements of the cordless charger of Embodiment 5.

A cordless charger 450 of Embodiment 5 will be described with reference to FIGS. 18 and 19. The cordless charger 450 of Embodiment 5 charges the battery pack 30 described in Embodiment 1, and is a modification of the cordless charger 50 described in Embodiment 1. In FIGS. 18 and 19, components that are common with the cordless charger 50 of Embodiment 1 have been assigned the same reference numbers.

The cordless charger 450 of Embodiment 5 comprises a battery unit 450a detachably attached to an adapter unit 450b. The at least one rechargeable battery 56 and the second charger interface 58 described in Embodiment 1 are provided in the battery unit 450a. The battery pack interface 52 and the charging controller 54 described in Embodiment 1 are provided in the adapter unit 450a. In addition, in this embodiment, an adapter unit interface 460 is also provided on the battery unit 450a, and a battery unit interface 462 is also provided on the adapter unit 450b. The battery unit 450a and the adapter unit 450b are electrically connected via the adapter unit interface 460 and the battery unit interface 462.

When connected to both the battery unit 450a and the adapter unit 450b, the cordless charger 450 of the present embodiment is substantially equivalent to the cordless charger 50 of Embodiment 1 with respect to its structure and function. According to the cordless charger 450 of this embodiment, a plurality of battery units 450a are provided and used one after another, thereby making it possible for a user to frequently charge the battery pack 30. By sharing the adapter unit 450b having the pack interface 52 and charging controller 54 with the plurality of battery units 450a, the construction of the overall system can be simplified, and manufacturing costs can be reduced.

The battery unit 450a can be detached from the AC charger 70 when removed from the adapter unit 450b. In other words, the battery unit 450a is configured to be charged by the AC charger 70, and the adapter unit 450b is not required for the recharging operation. According to this construction, the battery pack can be continuously charged by attaching a fully charged battery unit 450a to the adapter unit 450b while another battery unit 450a is detached from the adapter unit 450b and is being charged. Although the AC charger of the present embodiment can also charge the battery pack 30, it is sufficient if the AC charger 70 is capable of charging at least the battery unit 450a.

Figure 20:
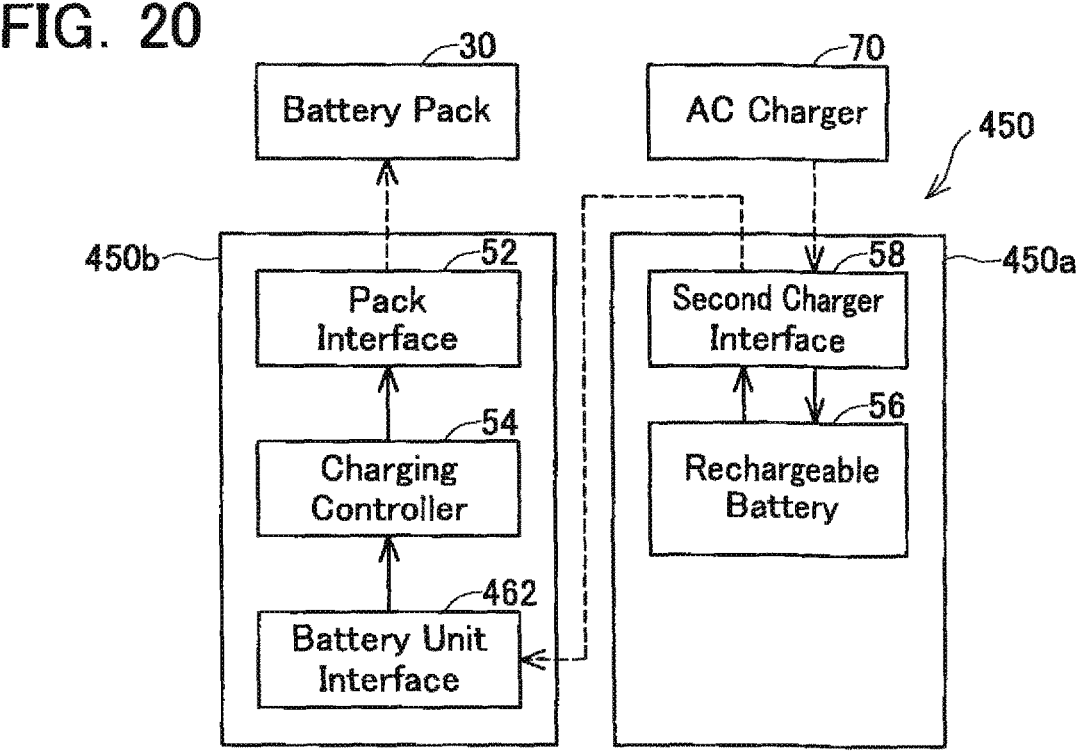
FIG. 20 is a block diagram that shows a modification of the cordless charger of Embodiment 5.

FIG. 20 shows a modification of Embodiment 5. As shown in FIG. 20, a battery unit interface 462 of an adapter unit 450b is preferably constructed to be electrically detachable from a second charger interface 58 of a battery unit 450a. According to such a configuration, the second charger interface 58 can also be made to function as the adapter unit interface 460 shown in FIG. 19. In this embodiment, there will no longer be any need for the adapter unit interface 460 to be separately provided, and the construction of the battery unit 450a can be simplified.

Embodiment 6

Figure 21:
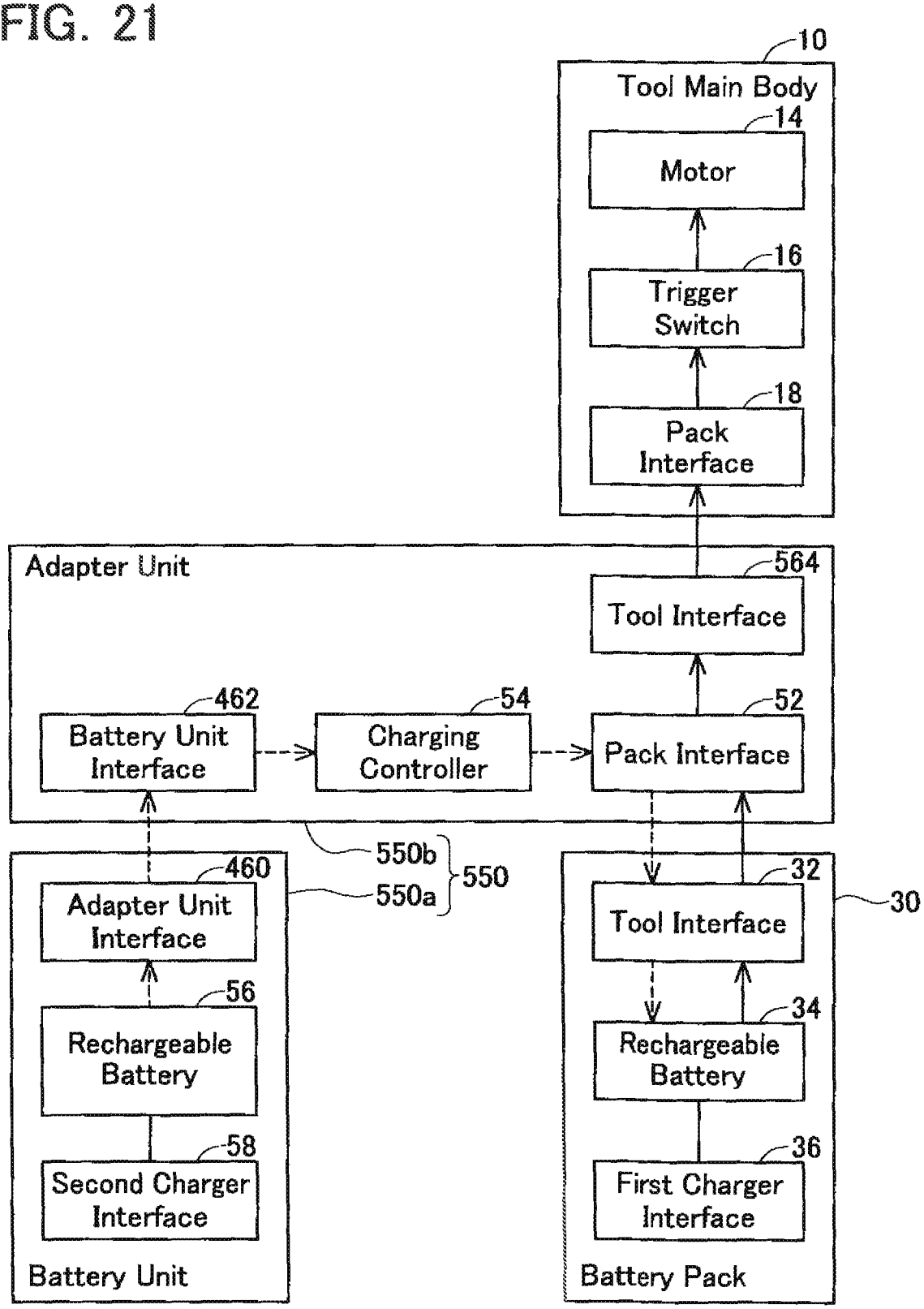
FIG. 21 is a block diagram that shows the construction and functional elements of a cordless charger of Embodiment 6.

FIG. 21 shows a cordless charger 550 of Embodiment 6. As shown in FIG. 21, the cordless charger 550 includes a battery unit 550a and an adapter unit 550b, similar to the cordless charger 450 of Embodiment 5. However, in the cordless charger 550 of the present embodiment, the adapter unit 550b further includes a tool interface 564. The tool interface 564 interfaces with the tool main body 10. The tool interface 564 is electrically connected with a battery pack interface 52 inside the adapter unit 550b. The adapter unit 550b of the present embodiment is constructed so as to be electrically interposed between a tool main body 10 and a battery pack 30, and connects the tool main body 10 and the battery pack 30 both mechanically and electrically.

In order to use an electric power tool, the adapter unit 550b is first electrically interposed between the tool main body 10 and the battery pack 30. When the user causes the electric power tool to operate, the electric current output from the battery pack 30 is supplied to the tool main body 10 via the adapter unit 550b. In FIG. 21, the current flow is shown with the solid arrows. While the electric power tool is stopped, the battery pack 30 can be charged by connecting the battery unit 550a to the adapter unit 550b. At this time, the charging current from the battery unit 550a will be supplied to the battery pack 30 via the adapter unit 550b. In FIG. 21, the flow of charging current is shown with the broken arrows. There is no need to detach the battery pack 30 from the tool main body 10 when the battery pack 30 requires charging.

According to the cordless charger 550 of the present embodiment, the first charger interface 36 of the battery pack 30 is not necessary. Thus, the battery pack 30 need not necessarily include the first charger interface 36. Because of this, the cordless charger 550 of the present embodiment also can be utilized with conventional electric power tools systems. In other words, the adapter unit 550b can also be electrically interposed between a conventional tool main body 10 and battery pack 30, and because of this, it becomes possible to charge the battery pack 30 using the rechargeable battery 56 of the battery unit 550a. Therefore, even conventional battery packs 30 can be charged while being attached to the tool main body 10.

In the cordless charger 550 of the present embodiment, one of the adapter unit interface 460 and second charger interface 58 of the battery unit 550a can be eliminated by configuring one interface to serve both functions. In addition, part or all of the charging controller 54 may be provided on the battery unit 550a instead of the adapter unit 550b.

In any of the preceding embodiments, the battery pack 30 is preferably adapted to output a nominal power of at least 300 Watts, e.g., more than 450 Watts, or even more than 600 Watts. Further, the first charger 50, 150, 250, 350, 450, 550 preferably comprises a plurality of series-connected battery cells adapted to store sufficient charge to completely recharge the battery pack at least once, more preferably at least twice, more preferably at least five times and even more preferably at least ten times.

In any of the preceding embodiments, the battery pack 30 preferably has a nominal voltage greater than 10 volts, e.g., between 10-40 volts, e.g., between about 14 to 30 volts, e.g., between about 21 to 30 volts. In addition or in the alternative, the battery pack 30 preferably has a nominal output current equal to or greater than 10 amps, more preferably equal to or greater than 15 amps. In addition or in the alternative, the battery pack 30 preferably has a nominal capacity of at least 0.5 amp-hour, e.g., equal to or more than 1.0 amp-hour, e.g., equal to or greater than 2.0 amp-hour.

The invention claimed is:

1. An electric power tool system comprising:
   a tool main body;
   a battery pack configured to be detachably attached to the tool main body, wherein the battery pack comprises:
     at least one rechargeable battery,
     a battery pack housing containing the at least one rechargeable battery, and
     a charge receiving element electrically connected to the at least one rechargeable battery and disposed on or within the battery pack housing; and
   a first charger configured to charge the battery pack, wherein the first charger comprises:
     at least one rechargeable battery configured to supply energy to charge the at least one rechargeable battery of the battery pack, and
     a charge transmitting element electrically connected to the at least one battery of the first charger and configured to wirelessly transmit the energy to the charge receiving element of the battery pack.

2. The electric power tool system according to claim 1, wherein the charge transmitting element is configured to charge the at least one rechargeable battery by electromagnetic induction.

3. The electric power tool system according to claim 1, wherein the charge transmitting element comprises at least one transmitting coil and the charge receiving element comprises at least one receiving coil.

4. The electric power tool system according to claim 3, wherein
   the at least one transmitting coil is configured to generate an electromagnetic field when a first charging current, supplied by the at least one rechargeable battery, flows through the at least one transmitting coil, and
   the at least one receiving coil is configured to output a second charging current when the at least one receiving coil is placed within the electromagnetic field generated by the at least one transmitting coil.

5. The electric power tool system according to claim 1, wherein the first charger further comprises a battery pack interface configured to detachably receive the battery pack housing such that the charge receiving element of the battery pack is positioned within an electromagnetic field generated by the charge transmitting element of the first charger.

6. The electric power tool system according to claim 5, wherein the first charger further comprises at least one charger housing on which the battery pack interface is disposed.

7. The electric power tool system according to claim 6, wherein the at least one charger housing contains the at least one rechargeable battery of the first charger.

8. The electric power tool system according to claim 7, wherein the at least one charger housing comprises a first charger housing that contains the at least one rechargeable battery of the first charger and a second charger housing on which the battery pack interface is disposed, the second charger housing being detachably attachable to the first charger housing.

9. The electric power tool system according to claim 5, wherein the battery pack interface is configured to receive the battery pack housing while the battery pack is attached to the tool main body.

10. The electric power tool system according to claim 1, further comprising a second charger configured to charge the at least one rechargeable battery of the first charger.

11. The electric power tool system according to claim 10, wherein
    the first charger further comprises at least one housing containing the at least one rechargeable battery of the first charger, and
    the second charger is contained within the at least one housing of the first charger.

12. The electric power tool system according to claim 10, wherein
    the first charger further comprises at least one housing containing the at least one rechargeable battery of the first charger, and
    the second charger comprises a housing containing a charging controller, the at least one housing of the first charger being removably mountable on the housing of the second charger to charge the at least one rechargeable battery of the first charger.

13. The electric power tool system according to claim 1, wherein the tool main body further comprises an electric motor, a trigger switch operable to control the electric motor and a tool chuck operably coupled to an output of the electric motor.

14. The electric power tool system according to claim 1, wherein the at least one rechargeable battery of the first charger is configured to store sufficient charge to completely recharge the at least one rechargeable battery of the battery pack.

15. The electric power tool system according to claim 1, wherein the at least one rechargeable battery of the battery pack comprises a plurality of lithium ion cells.

16. The electric power tool system according to claim 1, wherein the at least one rechargeable battery of the first charger comprises a plurality of lithium ion cells.

17. An electric power tool system comprising:
    a tool main body;
    a battery pack configured to be detachably attached to the tool main body and comprising a battery pack housing and at least one rechargeable battery in the battery pack housing; and
    a first charger including at least one rechargeable battery, the first charger being configured to wirelessly charge the at least one rechargeable battery of the battery pack.

18. The electric power tool system according to claim 17, wherein the at least one rechargeable battery of the first charger has a charge storage capacity that is larger than a charge storage capacity of the at least one rechargeable battery of the battery pack.

19. The electric power tool system according to claim 17, including a second charger configured to charge the rechargeable battery of the first charger, the second charger including a charger controller.

20. The electric power tool system according to claim 17, wherein the first charger includes a charger induction coil and the battery pack includes a battery pack induction coil, the battery pack induction coil being configured to receive electromagnetic energy from the charger induction coil.

* * * * *